(12) United States Patent
Echigo et al.

(10) Patent No.: US 12,126,064 B2
(45) Date of Patent: *Oct. 22, 2024

(54) METAL SUPPORT-TYPE FUEL CELL AND FUEL CELL MODULE

(71) Applicant: Osaka Gas Co., Ltd., Osaka (JP)

(72) Inventors: Mitsuaki Echigo, Osaka (JP); Hisao Onishi, Osaka (JP); Noritoshi Shinke, Osaka (JP); Yuji Tsuda, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/040,469

(22) PCT Filed: Mar. 29, 2019

(86) PCT No.: PCT/JP2019/014222
§ 371 (c)(1),
(2) Date: Sep. 22, 2020

(87) PCT Pub. No.: WO2019/189843
PCT Pub. Date: Oct. 3, 2019

(65) Prior Publication Data
US 2021/0028478 A1    Jan. 28, 2021

(30) Foreign Application Priority Data
Mar. 30, 2018    (JP) .................. 2018-070210

(51) Int. Cl.
*H01M 8/1226*    (2016.01)
*H01M 4/90*    (2006.01)
(Continued)

(52) U.S. Cl.
CPC ....... *H01M 8/1226* (2013.01); *H01M 4/9041* (2013.01); *H01M 8/0637* (2013.01); *H01M 8/2432* (2016.02)

(58) Field of Classification Search
CPC ............. H01M 8/1226; H01M 4/9041; H01M 8/0637; H01M 8/2432; H01M 8/0206;
(Continued)

(56) References Cited

U.S. PATENT DOCUMENTS

| | | | |
|---|---|---|---|
| 6,033,794 A | * | 3/2000 | George ............... H01M 8/0625 429/464 |
| 2003/0077504 A1 | | 4/2003 | Hara et al. |

(Continued)

FOREIGN PATENT DOCUMENTS

| | | |
|---|---|---|
| CN | 101687190 A | 3/2010 |
| CN | 102460793 A | 5/2012 |

(Continued)

OTHER PUBLICATIONS

English translation of JPH0613094A (Year: 1994).*
(Continued)

*Primary Examiner* — Ula C Ruddock
*Assistant Examiner* — Sarika Gupta
(74) *Attorney, Agent, or Firm* — The Webb Law Firm

(57) ABSTRACT

A metal support-type fuel cell that has a configuration in which a fuel cell element is supported by a metal support, and is capable of reasonably and effectively utilizing an internal reforming reaction even when an anode layer provided in the fuel cell element has a thickness of several tens of micron order is obtained. A fuel cell element is formed in a thin layer shape on a metal support, an internal reforming catalyst layer for producing hydrogen from a raw fuel gas by a steam reforming reaction is provided in a cell unit, and an internal reformed fuel supply path for discharging steam generated by a power generation reaction from an anode layer to lead the steam to the internal reforming catalyst layer, and leading the produced hydrogen to the anode layer is provided.

17 Claims, 22 Drawing Sheets

(51) Int. Cl.
*H01M 8/0637* (2016.01)
*H01M 8/2432* (2016.01)

(58) Field of Classification Search
CPC ....... H01M 8/0232; H01M 2008/1293; H01M 8/04007; H01M 8/0494; C01B 2203/0233; C01B 2203/066; C01B 2203/067; C01B 2203/1047; C01B 2203/1058; C01B 2203/107; C01B 2203/1082; C01B 2203/1241; C01B 2203/1258; C01B 3/38; Y02E 60/50
See application file for complete search history.

(56) References Cited

U.S. PATENT DOCUMENTS

| | | | |
|---|---|---|---|
| 2005/0053819 A1 | 3/2005 | Paz | |
| 2005/0170234 A1* | 8/2005 | Liu | H01M 8/0637 429/495 |
| 2005/0250002 A1* | 11/2005 | Stanley | H01M 4/8828 429/534 |
| 2005/0260002 A1 | 11/2005 | Masui | |
| 2006/0127747 A1* | 6/2006 | Arico | C01G 53/006 429/513 |
| 2006/0286417 A1* | 12/2006 | Aoyama | H01M 4/94 429/513 |
| 2007/0015015 A1* | 1/2007 | Hoshino | H01M 8/0637 429/522 |
| 2012/0015271 A1* | 1/2012 | Shigezumi | H01M 8/04701 429/432 |
| 2012/0058406 A1 | 3/2012 | Lee et al. | |
| 2012/0121999 A1 | 5/2012 | Laurenein et al. | |
| 2019/0131644 A1* | 5/2019 | Wang | B01J 21/04 |
| 2019/0393525 A1* | 12/2019 | Diethelm | H01M 8/0494 |

FOREIGN PATENT DOCUMENTS

| | | | | |
|---|---|---|---|---|
| JP | 63207054 | A | | 8/1988 |
| JP | 63310574 | A | | 12/1988 |
| JP | H0613094 | A | * | 1/1994 |
| JP | 2003132906 | A | | 5/2003 |
| JP | 2004227849 | A | | 8/2004 |
| JP | 2005203258 | A | | 7/2005 |
| JP | 2012527068 | A | | 11/2012 |
| JP | 2016195029 | A | * | 11/2016 |
| JP | 2017183177 | A | * | 10/2017 |
| JP | 2017183224 | A | | 10/2017 |
| JP | 2017208232 | A | * | 11/2017 |
| JP | 201837329 | A | | 3/2018 |
| KR | 1020120022449 | A | | 3/2012 |
| WO | 2008123968 | A1 | | 10/2008 |
| WO | 2008132493 | A2 | | 11/2008 |

OTHER PUBLICATIONS

English translation of JP-2017208232-A (Year: 2017).*
English translation of JP-2016195029-A (Year: 2016).*
English translation of JP-2017183177-A (Year: 2017).*
Extended European Search Report issued in EP19775482.3 on Nov. 25, 2021.
Office Action issued in JP2020511138 on Sep. 7, 2022.
Office Action issued in CN201980023165.1 on Feb. 14, 2023.
Office Action issued in KR1020207019501 on Nov. 23, 2023.

* cited by examiner

METAL SUPPORT-TYPE FUEL CELL AND FUEL CELL MODULE

CROSS-REFERENCE TO RELATED APPLICATIONS

This application is the United States national phase of International Application No. PCT/JP2019/014222 filed Mar. 29, 2019, and claims priority to Japanese Patent Application No. 2018-070210 filed Mar. 30, 2018, the disclosures of which are hereby incorporated by reference in their entirety.

BACKGROUND OF THE INVENTION

Field of the Invention

The present invention relates to a fuel cell including: a fuel cell element in which an anode layer and a cathode layer are formed with an electrolyte layer interposed therebetween; a reducing gas supply path for supplying a gas containing hydrogen to the anode layer; and an oxidizing gas supply path for supplying a gas containing oxygen to the cathode layer.

Description of Related Art

The fuel cell element generates power as a single unit by supplying required gases (a reducing gas and an oxidizing gas) to the anode layer and the cathode layer. In the present specification, a unit configured to include the fuel cell element, the reducing gas supply path, and the oxidizing gas supply path is referred to as a "fuel cell single unit". Furthermore, a plurality of these fuel cell single units are stacked in a predetermined direction to construct a fuel cell module according to the present invention. The fuel cell module is a core of a fuel cell device according to the present invention.

As the background art related to this type of fuel cell, techniques described in JP-A-2017-208232, JP-A-2016-195029, and JP-A-2017-183177 can be mentioned.

The object of the technique disclosed in JP-A-2017-208232 is to provide a fuel cell capable of preventing both an excessively high temperature and temperature unevenness during power generation without sacrificing a power generation performance, and the fuel cell includes a fuel supply flow path (corresponding to the "reducing gas supply path" of the present invention) (210 and 125) which is a flow path for supplying a fuel gas (corresponding to the "gas containing hydrogen" of the present invention) to a fuel electrode (corresponding to the "anode layer" of the present invention) 112. Furthermore, in the fuel supply flow path, a reforming catalyst unit PR1 for causing a steam reforming reaction is provided on a surface which is spaced from the fuel electrode 112 and faces the fuel electrode 112.

In the technique disclosed in JP-A-2017-208232, a reformed gas reformed by the reforming catalyst unit PR1 is introduced into the fuel electrode. Moreover, the reformed gas is consumed at the fuel electrode, and discharged from an outlet of the fuel supply flow path. In the technique, temperature rise of the fuel cell element is prevented by utilizing the fact that the steam reforming reaction is an endothermic reaction (heat supply is required). Here, a site where the reforming catalyst unit PR1 is provided is a site on an upstream side of fuel gas supply with respect to the fuel electrode, and an exhaust gas which has undergone a cell reaction is discharged from an exhaust gas flow path different from the flow path in which a reforming catalyst unit PB1 is provided. FIG. 19(c) of the present specification schematically shows this structure.

Furthermore, based on judgment from the drawings and the like, in terms of the structure, the fuel cell disclosed in JP-A-2017-208232 is a so-called anode electrode support-type fuel cell.

On the other hand, in JP-A-2016-195029 and JP-A-2017-183177, the inventors propose that the fuel cell element is provided in a thin layer shape on one surface of a metal support.

In the technique disclosed in JP-A-2016-195029, an electrochemical element is formed in a flat plate shape, and in the technique disclosed in JP-A-2017-183177, an electrochemical element is formed in a disc shape.

The techniques disclosed in these patent literatures relate to the electrochemical element, an electrochemical module, and an electrochemical device, but when the electrochemical element receives supply of a gas containing hydrogen and a gas containing oxygen to generate power, the electrochemical element serves as a fuel cell element, the electrochemical module serves as a fuel cell module, and the electrochemical device serves as a fuel cell device.

In the techniques disclosed in JP-A-2016-195029 and JP-A-2017-183177, by supporting the fuel cell element by the metal support, each layer (at least the anode layer, the electrolyte layer, and the cathode layer) forming the fuel cell element formed on one surface of the metal support can also be an extremely thin layer of micron order to several tens of micron order. Needless to say, the layer may have a thickness of about several millimeters.

In the conventional anode support-type fuel cell disclosed in JP-A-2017-208232, the anode layer is thick (generally, several millimeter order), and an internal reforming reaction also proceeds at once at an inlet portion where the fuel gas is introduced. For this reason, an inlet temperature of the fuel cell is lowered, and conversely, a temperature of an exhaust gas side is maintained at an original temperature of the fuel cell element. Therefore, a side where the reforming catalyst unit is provided is likely to have a low temperature, and a temperature difference between an inlet side and an outlet side is likely to occur.

Furthermore, steam is produced in a fuel cell reaction, but an exhaust gas, which has undergone a cell reaction, is discharged from the exhaust gas flow path without passing through the reforming catalyst unit, and thus the steam is not usefully utilized for the internal reforming reaction.

In the techniques disclosed in JP-A-2016-195029 and JP-A-2017-183177, since in a metal support-type fuel cell, the anode layer formed on the metal support is as thin as several tens of micron order, effects of the internal reforming reaction are less likely to be obtained compared to the anode support-type fuel cell disclosed in JP-A-2017-208232, and high power generation efficiency as in the anode support-type fuel cell is difficult to realize.

SUMMARY OF THE INVENTION

In consideration of such a circumstance, a main object of the present invention is to obtain a fuel cell that has a configuration in which a fuel cell element is supported by a metal support, and is capable of reasonably and effectively utilizing an internal reforming reaction even when an anode layer provided in the fuel cell element has a thickness of several tens of micron order.

Solution to Problem

A first feature configuration of the present invention is that the present invention is configured as a fuel cell single unit including a fuel cell element in which an anode layer and a cathode layer are formed with an electrolyte layer interposed therebetween, a reducing gas supply path for supplying a gas containing hydrogen to the anode layer, and an oxidizing gas supply path for supplying a gas containing oxygen to the cathode layer, the fuel cell element is formed in a thin layer shape on a metal support, an internal reforming catalyst layer for producing hydrogen from a raw fuel gas by a steam reforming reaction is provided in the fuel cell single unit, and an internal reformed fuel supply path for discharging steam generated by a power generation reaction from the anode layer to lead the steam to the internal reforming catalyst layer, and leading hydrogen produced in the internal reforming catalyst layer to the anode layer is provided.

According to this feature configuration, the fuel cell element is configured to be supported by the metal support, and at least hydrogen is supplied to the anode layer through the reducing gas supply path. On the other hand, at least oxygen is supplied to the cathode layer through the oxidizing gas supply path. As a result, by supplying these gases, a cell reaction can be favorably caused. Furthermore, since the fuel cell element is supported by a metal support separate from the cell, it is not necessary to thicken the anode layer, for example, in order to maintain a strength of the fuel cell element, and as will be described later, it is also possible to make the fuel cell element as thin as a thickness of, for example, several tens of microns to several hundreds of microns.

Incidentally, in an operation of the fuel cell configured in this way, according to a composition of the fuel cell element, it is necessary to maintain a temperature range (for example, as will be described later, when the fuel cell is SOFC, an operating temperature thereof is about 700° C.) required for a cell reaction. Since the cell reaction itself is an exothermic reaction, the cell can continue to operate by appropriate heat removal in a state where the temperature reaches a predetermined temperature range. The temperature range is a so-called steam reforming proceeding temperature range.

In addition, in the fuel cell single unit according to the present invention, the internal reforming catalyst layer is provided, and the internal reformed fuel supply path is further provided. The internal reformed fuel supply path serves as a functional site for leading at least steam produced in the anode layer to the internal reforming catalyst layer.

As a result, by supplying the raw fuel gas to be steam-reformed, to the internal reforming catalyst layer, the steam produced by the power generation reaction can be utilized to cause internal reforming of the gas. Moreover, by leading hydrogen, which is produced in this way, to the anode layer through the internal reformed fuel supply path, the hydrogen can be provided for power generation.

That is, the internal reformed fuel supply path in the present invention serves both as a discharge unit of steam released from the anode layer, and as a supply unit for re-leading hydrogen produced by steam reforming to the anode layer.

As a result, as will be described later, in the metal support-type fuel cell having this configuration, power generation efficiency can be improved compared to a fuel cell which performs steam reforming only with the external reformer without including the internal reforming catalyst layer. In particular, the power generation efficiency is remarkably improved in a region of a low steam/carbon molar ratio (S/C ratio). Moreover, since a difference in the hydrogen partial pressures between an inlet and an outlet of the reducing gas supply path for supplying the gas containing hydrogen to the anode layer can be reduced, an effect of suppressing deterioration of the fuel cell element, which is likely to be caused under a low hydrogen partial pressure, can also be obtained.

As a result, by adopting the configuration of the present invention, the internal reforming reaction can be caused in a metal support-type cell unit while effectively utilizing the steam produced in the anode layer of the fuel cell, and even when the fuel cell is a metal support type, a cell having favorable power generation efficiency can be obtained. Furthermore, since concentration distribution and utilization rate distribution of the fuel gas (the gas is referred to as a "fuel gas for power generation" in some cases in the present specification. The fuel gas for power generation is specifically hydrogen and carbon monoxide, and is a gas obtained by reforming a raw fuel gas) used in power generation inside the fuel cell element can be reduced (a concentration of the fuel gas for power generation is uniformized inside), a metal support-type fuel cell having high efficiency and excellent durability can be obtained.

In addition, in this configuration, a steam reforming unit which is an endothermic reaction unit and a cell reaction unit which is an exothermic reaction unit appear so as to coexist sequentially in a flow direction of a gas in the reducing gas supply path, and thus the temperature distribution is likely to occur and reliability can be ensured, compared to the structure described in JP-A-2017-208232 in which these sites are separately provided.

A second feature configuration of the present invention is that a plurality of through-holes penetrating the metal support are provided, the anode layer is provided on one surface of the metal support, the reducing gas supply path is provided along the other surface of the metal support, the internal reforming catalyst layer is provided on at least a part of an inner surface of the reducing gas supply path, and each of the through-holes works in a flow direction in the reducing gas supply path to serve as the internal reformed fuel supply path.

According to this feature configuration, only by providing the plurality of through-holes in the metal support supporting the fuel cell element, the through-holes can play a role of the internal reformed fuel supply path.

In addition, with this configuration, the through-holes positioned on an upstream side in a flow direction in the reducing gas supply path play a role of the discharge unit described above, and through-holes positioned on a downstream side of the through-holes work as the supply unit.

As a result, with a relatively simple structure, the internal reformed fuel supply path according to the present invention can be obtained. In order to obtain this configuration, the reducing gas supply path may be directed in a specific direction.

Furthermore, an area of an opening part of a through-hole on a surface of the metal support on which the anode layer is provided is preferably smaller than an area of an opening part of a through-hole on the other surface of the metal support. This is because the supply of the fuel gas for power generation to the anode layer becomes easier by setting the area as described above.

A third feature configuration of the present invention is that in the metal support, the internal reforming catalyst layer is provided on a surface different from a surface on which the fuel cell element is formed.

According to this feature configuration, a specific surface, which is on the metal support and is different from a surface on which the fuel cell element is provided, can be utilized to be provided for internal reforming. Moreover, the internal reforming catalyst layer can be formed on the specific surface on the metal support, and provided for internal reforming, and thus a compact and high-performance metal support-type fuel cell can be obtained at a low cost.

A fourth feature configuration of the present invention is that at least one metal separator for partitioning the reducing gas supply path and the oxidizing gas supply path is provided in the fuel cell single unit, and the internal reforming catalyst layer is provided on at least a part of the metal separator on a side of the reducing gas supply path.

According to this feature configuration, the internal reformed fuel supply path can be constructed by utilizing the metal separator. Moreover, the internal reforming catalyst layer can be formed on at least a part of the metal separator on the side of the reducing gas supply path, and provided for internal reforming, and thus a compact and high-performance fuel cell device can be obtained at a low cost.

A fifth feature configuration of the present invention is that the internal reforming catalyst layer is provided inside the through-hole.

According to this feature configuration, the through-hole provided in the metal support can be utilized to be provided for internal reforming. Moreover, the internal reforming catalyst layer can be formed in the through-hole, and provided for internal reforming, and thus a compact and high-performance fuel cell device can be obtained at a low cost.

A sixth feature configuration of the present invention is that a reforming catalyst contained in the internal reforming catalyst layer is a catalyst in which a metal is supported on a support.

According to this feature configuration, by using the catalyst in which the metal is supported on the support, a high-performance internal reforming catalyst layer can be obtained despite reduction in a used amount of a metal used for a catalyst, and thus a high-performance fuel cell device can be obtained at a low cost.

A seventh feature configuration of the present invention is that a reforming catalyst contained in the internal reforming catalyst layer is a catalyst containing at least Ni.

According to this feature configuration, by using Ni which is a relatively easily available and inexpensive metal, steam reforming can be caused in the internal reforming catalyst layer.

An eighth feature configuration of the present invention is that the anode layer contains Ni.

With this feature configuration, when the fuel cell is an oxygen ion conductivity-type cell which operates at a relatively high temperature, a reaction between an oxygen ion sent to the anode layer and hydrogen contained in a fuel gas can be realized with Ni which is a relatively easily available and inexpensive metal.

A ninth feature configuration of the present invention is that a reforming catalyst contained the internal reforming catalyst layer is a catalyst containing Ni, the anode layer contains Ni, and a Ni content in the anode layer is different from a Ni content in the internal reforming catalyst layer.

According to this feature configuration, when Ni is incorporated in both the internal reforming catalyst layer and the anode layer, the respective layers can be realized by utilizing available and inexpensive Ni. Moreover, the reforming can also be caused inside the anode layer.

Incidentally, in the present invention, the internal reforming catalyst layer is provided to be included in the fuel cell single unit, and performs steam reforming by utilizing steam generated in the anode layer to reform a raw fuel gas (for example, methane) sent together with at least hydrogen, but a preferable concentration of the Ni catalyst in the steam reforming is different from a preferable concentration of Ni for a favorable cell reaction between an oxygen ion $O^{2-}$, which moves from the cathode layer to the anode layer, and at least hydrogen, and the former concentration is generally lower than the latter concentration. Therefore, by appropriately selecting the Ni concentration according to purposes of actions of these layers, the respective layers can be caused to appropriately work.

A tenth feature configuration of the present invention is that a Ni content in the anode layer is 35% by mass to 85% by mass (35 weight %~85 weight %).

According to this feature configuration, when the Ni content in the anode layer is less than 35% by mass, a conductive path for an electron which flows into the electrode layer and is generated, for example, by a reaction between an oxygen ion and hydrogen is less likely to be formed, and thus the power generation performance is less likely to be obtained. On the other hand, even when the Ni content is greater than 85% by mass, an additional reaction effect is less likely to be obtained. That is, it is difficult to enhance the cell reaction in the anode layer by incorporating Ni.

Furthermore, the Ni content in the anode layer is more preferably greater than 40% by mass, and still more preferably greater than 45% by mass. This is because the conductive path for the electron is more likely to be formed by setting the Ni content as described above, and thus the power generation performance can be improved. Moreover, the Ni content in the anode layer of 80% by mass or less is more preferable because a used amount of Ni is reduced and thus a cost is easily reduced.

An eleventh feature configuration of the present invention is that a Ni content in the internal reforming catalyst layer is 0.1% by mass to 50% by mass.

According to this feature configuration, in the internal reforming catalyst layer of which the temperature is almost the same as that of the fuel cell element, when the Ni content in the layer is set to be less than 0.1% by mass, an effect of reforming a raw fuel gas in contact with the layer is less likely to be obtained. On the other hand, even when the Ni content is greater than 50% by mass, an additional reforming effect is less likely to be obtained. That is, it is difficult to enhance the reforming reaction in the internal reforming catalyst layer by incorporating Ni.

Furthermore, the Ni content in the internal reforming catalyst layer is more preferably greater than 1% by mass, and still more preferably greater than 5% by mass. This is because the effect of reforming a raw fuel gas can be further enhanced by setting the Ni content as described above. Moreover, the Ni content in the internal reforming catalyst layer is more preferably 45% by mass or less and still more preferably 40% by mass or less. This is because the used amount of Ni is reduced by setting the Ni content as described above and thus a cost is easily reduced.

A twelfth feature configuration of the present invention is that a turbulence promotion component for disturbing flow in the reducing gas supply path is provided in the reducing gas supply path.

Flow of a gas flowing in the reducing gas supply path is likely to become laminar flow due to a configuration of the flow path, but by inserting the turbulence promotion component into the flow path, the flow is disturbed, and a direction (for example, flow orthogonal to main flow formed in the reducing gas supply path), which is different from a direction of the main flow, can be formed. As a result, the gas containing hydrogen can be efficiently supplied from the reducing gas supply path to the anode layer. Furthermore, the mixing and the release of the predetermined gas (a fuel gas, which is not yet reformed, or steam) to the internal reforming catalyst layer, which are described above, can be promoted, and the internal reforming by the internal reforming catalyst layer can be further promoted.

A thirteenth feature configuration of the present invention is that the fuel cell element is a solid oxide fuel cell.

According to this feature configuration, power generation can be performed by directly supplying a reformed gas reformed by the external reformer to the solid oxide fuel cell without going through additional reforming steps such as removal of carbon monoxide in the cathode layer C, and thus a fuel cell device having a simple configuration can be obtained.

Furthermore, the solid oxide fuel cell can be used at a power generation operating temperature in a high-temperature range of 650° C. or higher, but highly efficient power generation can be realized while effectively utilizing heat in the temperature range for the internal reforming reaction.

A fourteenth feature configuration of the present invention is that a fuel cell module is configured to include a plurality of the metal support-type fuel cells described above, in which the oxidizing gas supply path of one fuel cell single unit supplies the gas containing oxygen to the cathode layer of another fuel cell single unit adjacent to the one fuel cell single unit.

According to this feature configuration, when a plurality of the fuel cell single units are stacked (for example, the fuel cell single units may be piled up in a vertical direction or arranged side by side in a right-left direction) to construct a fuel cell module, a fuel cell module can be constructed by using the oxidizing gas supply path, which can be formed in one fuel cell single unit, as a source of supply of the oxidizing gas to the cathode layer of the fuel cell element configuring another fuel cell single unit, and using a relatively simple and standardized fuel cell single unit without requiring any other members.

A fifteenth feature configuration of the present invention is that a fuel cell device includes at least the fuel cell module and an external reformer, and includes a fuel supply unit for supplying a fuel gas containing a reducing component to the fuel cell module.

According to this feature configuration, by using an existing raw fuel supply infrastructure such as a city gas, a fuel cell device, which includes a fuel cell module having excellent durability, reliability, and performances, can be obtained. Moreover, since a system for recycling an unused fuel gas discharged from the fuel cell module is likely to be constructed, highly efficient fuel cell device can be obtained.

A sixteenth feature configuration of the present invention is that at least the fuel cell module and an inverter for extracting electric power from the fuel cell module are provided.

According to this feature configuration, the electric power generated in the fuel cell element can be extracted through the inverter, and the generated electric power can be appropriately utilized by performing electric power conversion, frequency conversion, or the like.

A seventeenth feature configuration of the present invention is that an exhaust heat utilization unit for reutilizing heat discharged from the fuel cell module and/or the external reformer is provided.

According to this feature configuration, the heat discharged from the fuel cell module and/or the external reformer can be utilized in the exhaust heat utilization unit, and thus a fuel cell device having excellent energy efficiency can be obtained. Moreover, a hybrid device having excellent energy efficiency can be obtained in combination with a power generation system which generates power by utilizing combustion heat of the unused fuel gas discharged from the fuel cell module.

DESCRIPTION OF THE INVENTION

Embodiments of the present invention will be described with reference to the drawings.

Hereinafter, as the embodiments of the present invention, a first embodiment, a second embodiment, and a third embodiment will be presented. In the description, for each embodiment, the entirety of a fuel cell device Y adopting each embodiment will be described, and then a fuel cell module M included in the fuel cell device Y and a fuel cell single unit U for constructing the fuel cell module M in a stacked state will be described.

A feature of the first embodiment is in that a fuel cell module M has a disc shape, and the fuel cell module M itself receives supply of a reducing gas and an oxidizing gas to operate as a cell, whereas the second embodiment has a feature in which a fuel cell module M has a substantially rectangular parallelepiped shape, and the fuel cell module M is housed in a housing 10 which houses an external reformer 34 and a vaporizer 33 to operate as a cell. In the third embodiment, a structure basically follows the structure of the first embodiment, and the fuel cell module M, which has a disc shape in the first embodiment, has a square shape. Fuel cell elements R according to the first embodiment and the third embodiment can be very thinly formed. On the other hand, a fuel cell element R according to the second embodiment can also be made thicker than the fuel cell element R according to the first embodiment. Needless to say, the fuel cell element R according to the second embodiment may be made relatively thin.

Providing an internal reforming catalyst layer D in the fuel cell single unit U and providing the external reformer 34, which are the features of the present invention, are common to all the embodiment.

In the present invention, the fuel cell single unit U includes the fuel cell element R formed on a metal support 1, and thus is configured as a "metal support-type fuel cell".

First Embodiment

Figure 1:
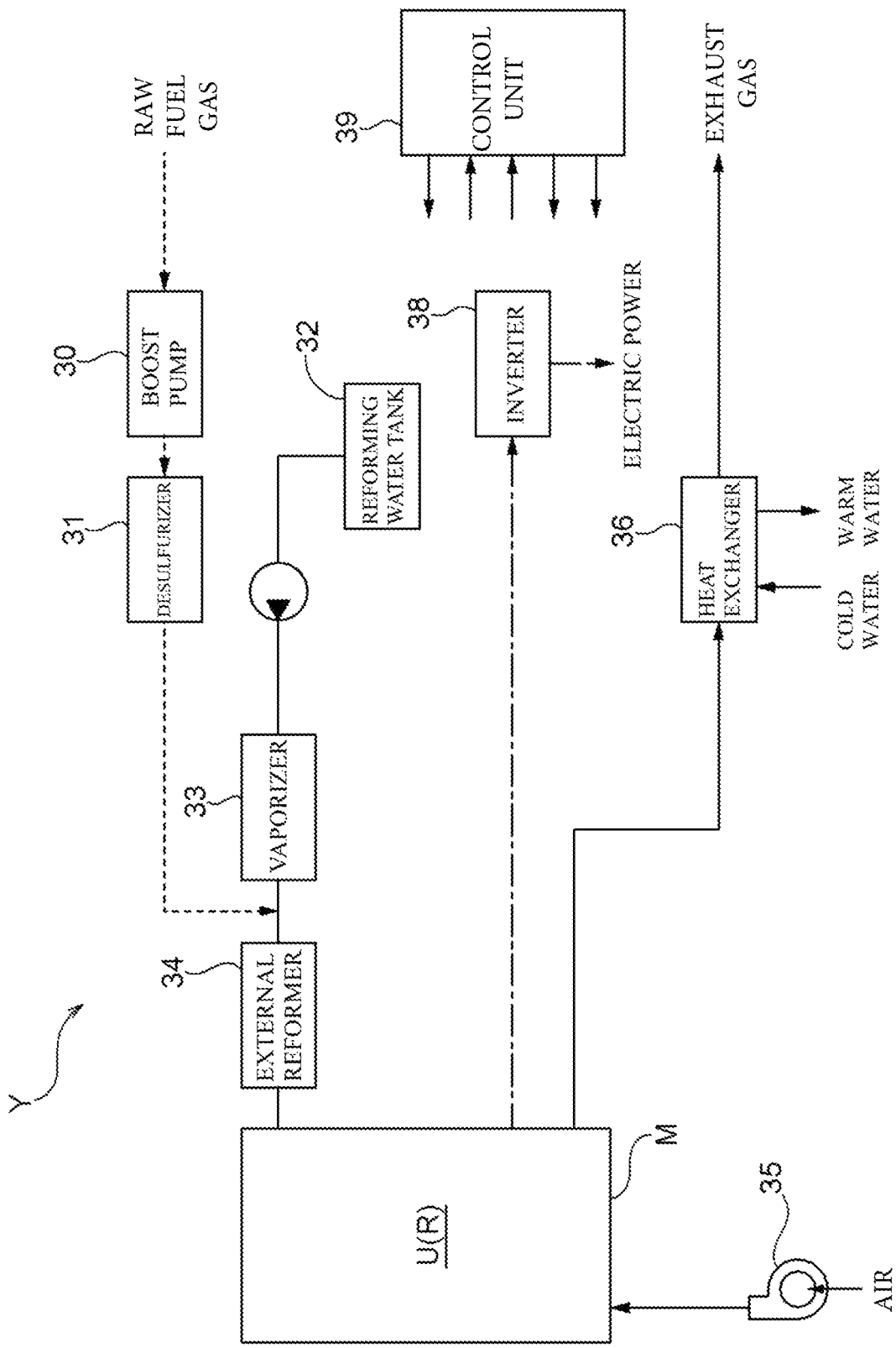
FIG. 1 is a diagram showing a schematic configuration of a fuel cell device according to a first embodiment.

FIG. 1 shows a configuration of the fuel cell device Y according to this embodiment.

<Fuel Cell Device>

The fuel cell device Y is a so-called "cogeneration system", which is capable of generating and supplying both electric power and heat. The electric power is output via an inverter 38, and as the heat, heat held by an exhaust gas can be recovered as warm water and utilized by a heat exchanger 36. The inverter 38 converts, for example, a direct current of the fuel cell module M into electric power having the same voltage and the same frequency as those of electric power received from a commercial system (not shown), and outputs the electric power. A control unit 39 appropriately controls the inverter 38, and also controls operations of respective machines configuring the fuel cell device Y.

The fuel cell device Y includes a boost pump 30, a desulfurizer 31, a reforming water tank 32, the vaporizer 33, and the external reformer 34, as a main machine for supplying a reducing gas to the fuel cell module M, which is responsible for power generation. A main machine for supplying an oxidizing gas is a blower 35, and the blower 35 is capable of sucking an air to supply an oxidizing gas containing oxygen.

A supply system (this system serves as a fuel supply unit in the fuel cell device) of the reducing gas will be further described. A hydrocarbon-based raw fuel gas such as a city gas (a gas which contains methane as a main component, and also contains ethane, propane, butane, and the like) is sucked and boosted by the boost pump 30, and sent to the fuel cell module M. Since the city gas contains a sulfur compound component, it is necessary to remove (desulfurize) the sulfur compound component in the desulfurizer 31. The raw fuel gas is mixed with reforming water supplied from the reforming water tank 32 on a latter stage side of the vaporizer 33, and water becomes steam in the vaporizer 33. The raw fuel gas and the steam are sent to the external reformer 34, and the raw fuel gas is steam-reformed. The steam reforming reaction is a reaction by a reforming catalyst stored in the reformer, and similarly to an internal reforming reaction described later, a part of a hydrocarbon-based raw fuel gas (for example, methane) is reformed, and gas (reformed gas) containing at least hydrogen is produced and provided for power generation.

The reforming by the external reformer 34 does not reform the entire raw fuel gas, but reforms the raw fuel gas at an appropriate ratio. Therefore, in the present invention, a gas, which is sent to an anode layer A configuring the fuel cell element R included in the fuel cell module M, is a mixed gas of the raw fuel gas (the gas which is not yet reformed) and the reformed gas. The reformed gas contains hydrogen and carbon monoxide, which are the fuel gases for power generation described above. The mixed gas is supplied to a reducing gas supply path L1 included in the fuel cell single unit U.

Figure 3:
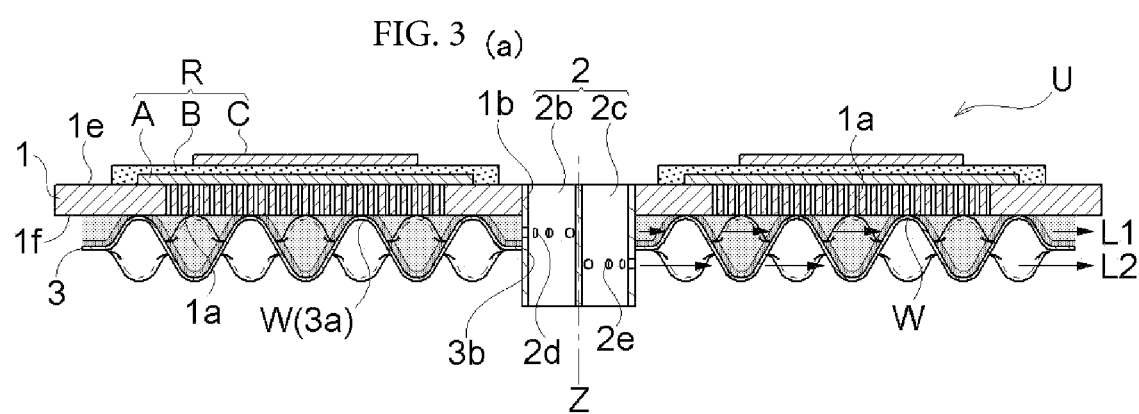
FIGS. 3(a) and 3(b) are cross-sectional views showing the structure of the fuel cell single unit according to the first embodiment.
Figure 3B:
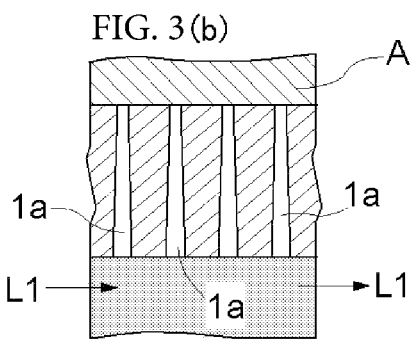
Figure 4:
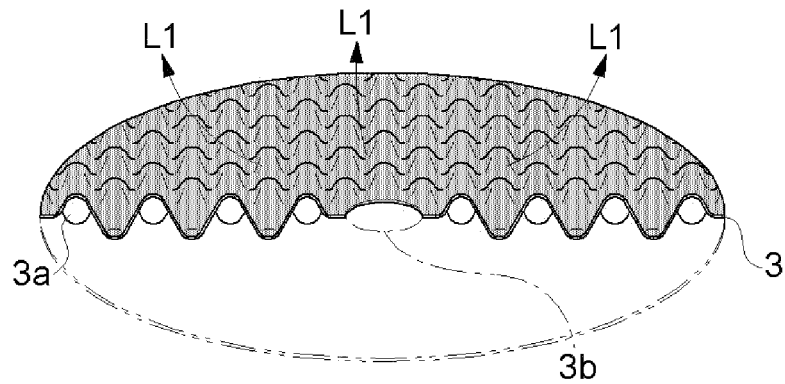
FIG. 4(a) is a perspective cross-sectional view and FIGS. 4(b) and 4(c) are cross-sectional views showing a structure of a current-collector plate with projections.
Figure 4:
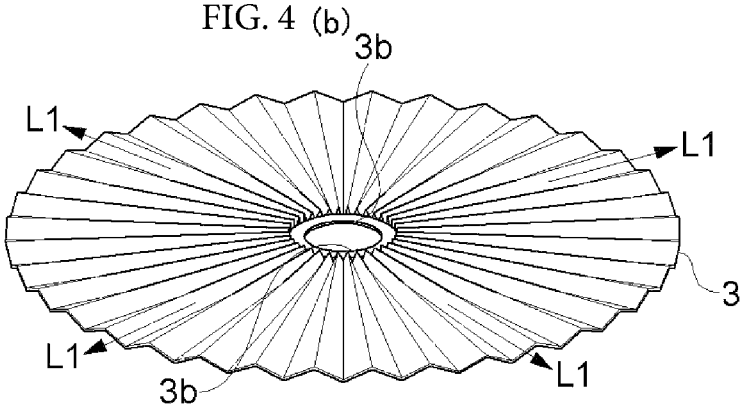
Figure 4:
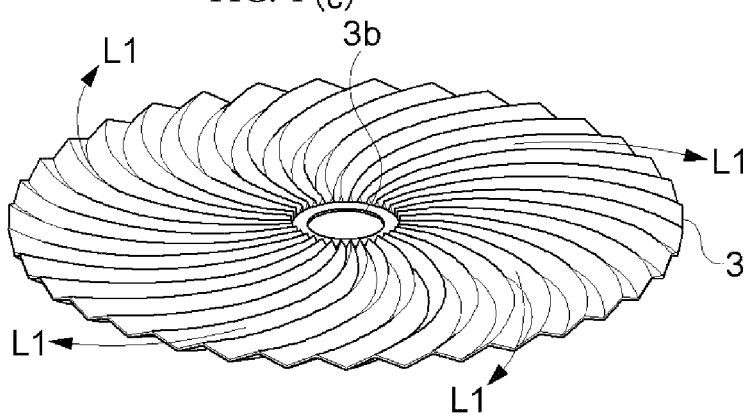

More specifically, as shown in FIGS. 3(a), 3(b), and 4, the reducing gas supply path L1 for supplying a gas containing hydrogen for power generation to the anode layer A is provided, the mixed gas (containing the raw fuel gas (the gas which is not yet reformed) and the reformed gas) is supplied to the reducing gas supply path L1, and at least hydrogen contained in the mixed gas is used in the fuel cell reaction in the fuel cell element R. An exhaust gas containing residual hydrogen, which has not been used in the reaction, is discharged from the fuel cell single unit U.

As described above, the heat exchanger 36 exchanges heat between the exhaust gas from the fuel cell module M and the supplied cold water to produce warm water. The heat exchanger 36 serves as an exhaust heat utilization unit of the fuel cell device Y. Instead of the exhaust heat utilization form, a form in which the exhaust gas discharged from the fuel cell module M is utilized for heat generation may be used. That is, the exhaust gas contains residual hydrogen and carbon monoxide, which have not been used in the reaction in the fuel cell single unit U, and a raw fuel gas, and thus heat generated by combustion of these combustible gases can be utilized. In the second embodiment described later, residual combustion components are utilized, as a fuel, for heating the external reformer 34 and the vaporizer 33.

<Fuel Cell Single Unit>

Figure 2:
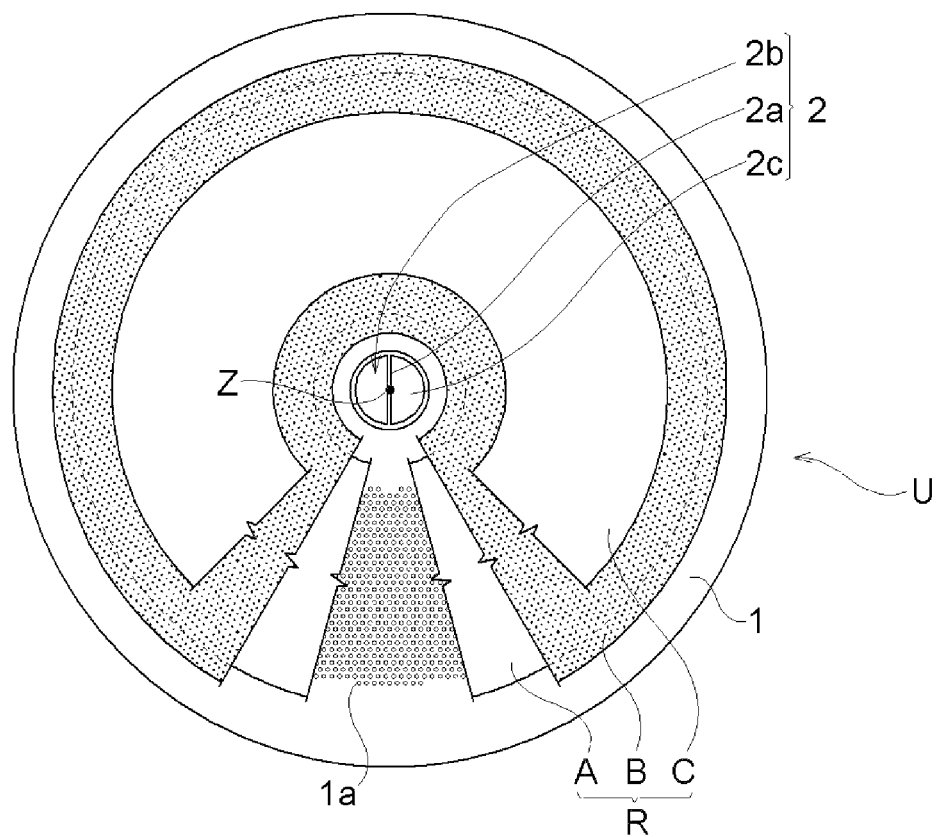
FIG. 2 is a top view showing a structure of a fuel cell single unit according to the first embodiment.

FIG. 2 and FIGS. 3(a) and 3(b) show a top view and cross-sectional views of the fuel cell single unit U according to the present embodiment.

The fuel cell single unit U is configured to include the fuel cell element R formed on the metal support 1, and a metal separator (a current-collector plate 3 with projections) bonded to a side opposite to the fuel cell element R. The metal support 1 in the present embodiment has a disc shape, the fuel cell element R is configured to include at least the anode layer (anode electrode layer) A, an electrolyte layer B, and a cathode layer (cathode electrode layer) C, and is formed and disposed on a front side 1e of the metal support 1, and the electrolyte layer B is interposed between the anode layer A and the cathode layer C. When the fuel cell element R is formed on the front side 1e of the metal support 1, the metal separator 3 is positioned on a rear side 1f of the metal support 1. That is, the fuel cell element R and the metal separator 3 are positioned so as to sandwich the metal support 1.

Figure 6:
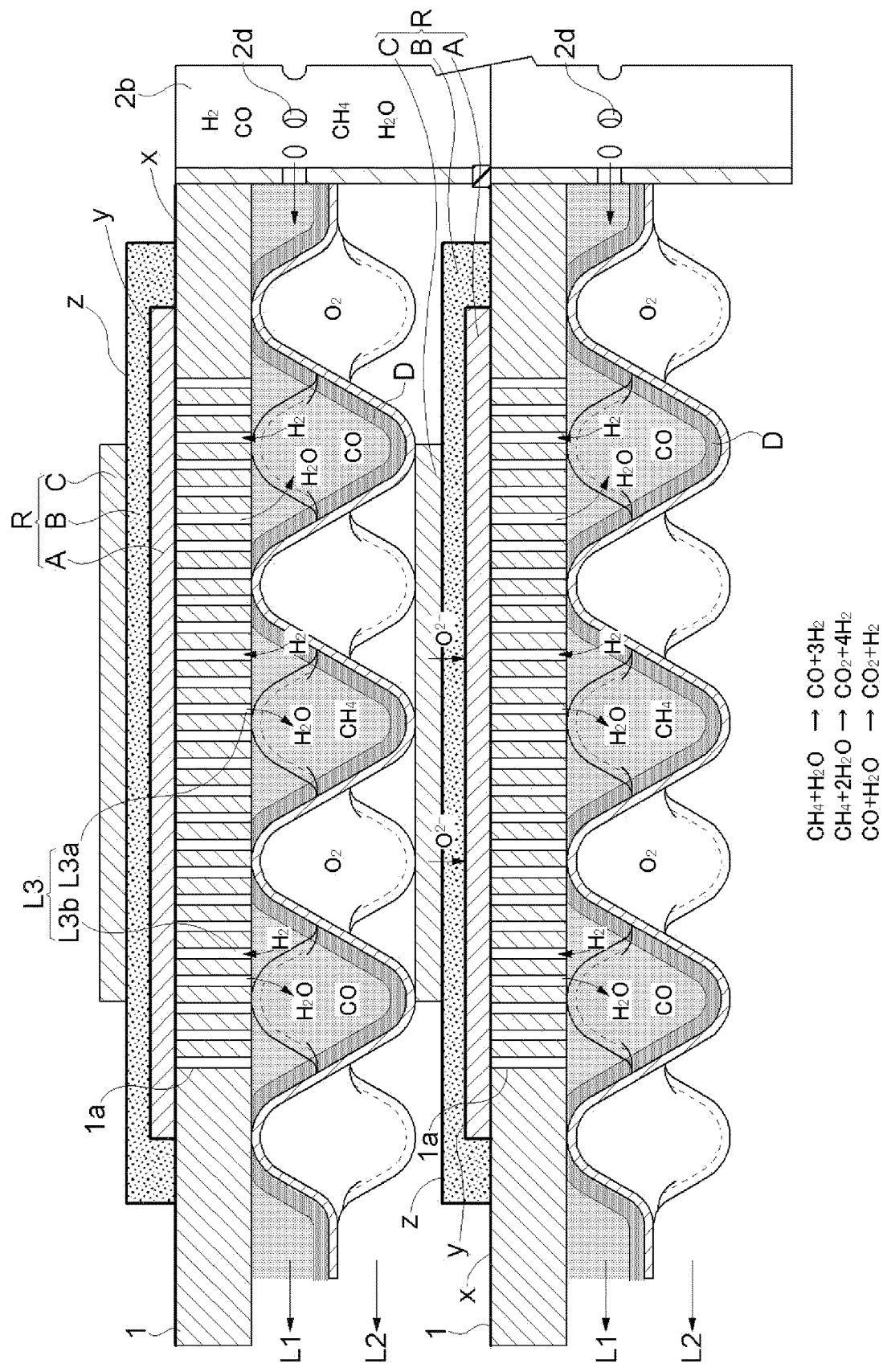
FIG. 6 is an explanatory view of a cell reaction and a reforming reaction in the first embodiment.

When the fuel cell single unit U includes the fuel cell element R and the metal separator 3 formed on the metal support 1 as described above, a gas containing at least hydrogen is supplied to the anode layer A through the reducing gas supply path L1, a gas containing oxygen is supplied to the cathode layer C through an oxidizing gas supply path L2, and thus power can be generated. Moreover, as a structural feature of the fuel cell single unit U, a metal oxide layer x is provided on the front side 1e of the metal support 1, an intermediate layer y is provided on a surface (including an interface between the anode layer A and the electrolyte layer B covering the anode layer A) of the anode layer A, and a reaction preventing layer z is provided on a surface (including an interface between the electrolyte layer B and the cathode layer C covering the electrolyte layer B) of the electrolyte layer B. The metal oxide layer x, the intermediate layer y, and the reaction preventing layer z are layers provided for suppressing diffusion of constituent materials between material layers sandwiching these layers x, y, and z, and are shown in FIG. 6 for easier understanding.

<Metal Support>

The metal support 1 is a flat plate which is made of a metal and has a disc shape.

As is also clear from FIGS. 2, 3(a), and 3(b), an opening part 1b concentric with the metal support 1 is formed in a center of the metal support 1. In the metal support 1, a plurality of through-holes 1a penetrating the front side 1e and the rear side 1f are formed. A gas can flow between the front side 1e and the rear side 1f of the metal support 1 through the through-hole 1a. The gas flowing through the through-hole 1a is specifically the reformed gas (containing hydrogen $H_2$) described above, and steam $H_2O$ produced by the power generation reaction in the fuel cell element R (see FIG. 6).

As a material for the metal support 1, a material having excellent electron conductivity, heat resistance, oxidation resistance, and corrosion resistance is used. For example, ferritic stainless alloy, austenitic stainless alloy, a nickel-based alloy, or the like is used. In particular, an alloy containing chromium is suitably used. In the present embodiment, a Fe—Cr-based alloy containing 18% by mass to 25% by mass of Cr is used for the metal support 1, but a Fe—Cr-based alloy containing 0.05% by mass or greater of Mn, a Fe—Cr-based alloy containing 0.15% by mass to 1.0% by mass of Ti, a Fe—Cr-based alloy containing 0.15% by mass to 1.0% by mass of Zr, a Fe—Cr-based alloy containing Ti and Zr and having a total content of Ti and Zr of 0.15% by mass to 1.0% by mass, and a Fe—Cr-based alloy containing 0.10% by mass to 1.0% by mass of Cu are particularly suitable.

The metal support 1 has a plate shape as a whole. Moreover, in the metal support 1, a surface on which the anode layer A is provided is the front side 1e, and the plurality of through-holes 1a penetrating from the front side 1e to the rear side 1f are provided. The through-hole 1a has a function of allowing a gas to permeate from the rear side 1f to the front side 1e of the metal support 1. Furthermore, by bending the plate-shaped metal support 1, for example, the plate-shaped metal support 1 can also be deformed in a shape such as a box shape and a cylindrical shape and used.

The metal oxide layer x as a diffusion suppressing layer is provided on the surface of the metal support 1 (see FIG. 6). That is, the diffusion suppressing layer is formed between the metal support 1 and the anode layer A described later. The metal oxide layer x is provided not only on the surface of the metal support 1 which is exposed to the outside but also on a contact surface (interface) with the anode layer A. Moreover, the metal oxide layer x can also be provided on an inner surface of the through-hole 1a. Element interdiffusion between the metal support 1 and the anode layer A can be suppressed by the metal oxide layer x. For example, when ferritic stainless containing chromium is used for the metal support 1, the metal oxide layer x mainly contains a chromium oxide. Furthermore, diffusion of a chromium atom or the like of the metal support 1 into the anode layer A or the electrolyte layer B is suppressed by the metal oxide layer x which contains a chromium oxide as a main component. The thickness of the metal oxide layer x may be any thickness as long as both a high diffusion preventing performance and low electric resistance are achieved.

The metal oxide layer x can be form by various methods, but a method for oxidizing the surface of the metal support 1 to form a metal oxide is suitably utilized. Moreover, on the surface of the metal support 1, the metal oxide layer x may be formed by a spray coating method (a method such as a thermal spraying method, an aerosol deposition method, an aerosol gas deposition method, a powder jet deposition method, a particle jet deposition method, and a cold spraying method), a PVD method such as a sputtering method and a PLD method, a CVD method, or the like, and may be formed by plating and an oxidation treatment. Furthermore, the metal oxide layer x may contain a spinel phase having high conductivity.

When a ferritic stainless material is used for the metal support 1, a thermal expansion coefficient of the metal support 1 is close to that of yttria-stabilized zirconia (YSZ) or gadolinium-doped ceria (GDC, also referred to as CGO) used as a material for the anode layer A or the electrolyte layer B. Therefore, even when a temperature cycle of a low temperature and a high temperature is repeated, the fuel cell element R is less likely to be damaged. Accordingly, a fuel cell element R having excellent long-term durability can be obtained, which is preferable.

As also described above, the metal support 1 has the plurality of the through-holes 1a provided so as to penetrate the front side 1e and the rear side 1f. Furthermore, for example, the through-hole 1a can be provided in the metal support 1 by mechanical, chemical, or optical boring processing. As also shown in FIG. 3(b), the through-hole 1a substantially has a tapered shape in which the front side 1e of the metal support 1 is narrow. The through-hole 1a has a function of allowing a gas to permeate from both the front and rear sides of the metal support 1. In order to impart gas permeability to the metal support 1, it is also possible to use a porous metal. For example, for the metal support 1, a sintered metal, a foamed metal, or the like can also be used.

<Fuel Cell Element>

As also described above, the fuel cell element R is configured to have: the anode layer A; the electrolyte layer B; the cathode layer C; and the intermediate layer y and the reaction preventing layer z, which are appropriately provided between these layers. The fuel cell element R is a solid oxide fuel cell SOFC. As described above, the fuel cell element R shown as the embodiment includes the intermediate layer y and the reaction preventing layer z, and thus the electrolyte layer B is indirectly interposed between the anode layer A and the cathode layer C. From the viewpoint that only cell power generation is caused, power can be generated by forming the anode layer A on one surface of the electrolyte layer B, and forming the cathode layer C on the other surface of the electrolyte layer B.

<Anode Layer>

As shown in FIGS. 3(a), 3(b), and 6 or the like, the anode layer A can be provided as a thin layer in a region which is on the front side 1e of the metal support 1 and is larger than a region where the through-holes 1a are provided. In a case of being provided as a thin layer, a thickness thereof can be, for example, about 1 μm to 100 μm and preferably 5 μm to 50 μm. When the thickness is set as described above, a sufficient electrode performance can be ensured while reducing a cost by reducing a used amount of an expensive material for the electrode layer. The entire region where the through-holes 1a are provided is covered with the anode layer A. That is, the through-hole 1a is formed inside a region of the metal support 1 where the anode layer A is formed. In other words, all the through-holes 1a are provided so as to face the anode layer A.

As a material for the anode layer A, for example, a composite material such as NiO-GDC, Ni-GDC, NiO-YSZ, Ni-YSZ, CuO—$CeO_2$, and Cu—$CeO_2$ can be used. In these examples, GDC, YSZ, and $CeO_2$ can be referred to as a composite aggregate.

In addition, the anode layer A is preferably formed by a low-temperature calcination method (for example, a wet method using a calcination treatment in a low-temperature range without performing a calcination treatment in a high-temperature range of higher than 1,100° C.), a spray coating method (a method such as a thermal spraying method, an aerosol deposition method, an aerosol gas deposition method, a powder jet deposition method, a particle jet deposition method, and a cold spraying method), a PVD method (a sputtering method, a pulsed laser deposition method, or the like), a CVD method, or the like. By these processes which can be used in a low-temperature range, a favorable anode layer A can be obtained without using calcination in a high-temperature range of higher than 1,100° C., for example. For the reason, the element interdiffusion between the metal support 1 and the anode layer A can be suppressed without damaging the metal support 1, and an electrochemical element having excellent durability can be obtained, which is preferable. Moreover, using the low-temperature calcination method is more preferable because handling of raw materials becomes easy.

Furthermore, an amount of Ni contained in the anode layer A can be in a range of 35% by mass to 85% by mass. Moreover, the amount of Ni contained in the anode layer A is more preferably greater than 40% by mass and still more preferably greater than 45% by mass because a power generation performance can be further enhanced. On the other hand, the amount of Ni is more preferably 80% by mass or less because a cost is easily reduced.

The anode layer A has a plurality of pores (not shown) inside and on the surface thereof so as to have gas permeability. That is, the anode layer A is formed as a porous layer. The anode layer A is formed, for example, so that the denseness is 30% or greater and less than 80%. As a size of the pore, a size suitable for allowing an electrochemical reaction to smoothly proceed during the reaction can be appropriately selected. Moreover, the denseness is a proportion of a material constituting a layer to a space, can be expressed as (1—porosity), and is equivalent to a relative density.

(Intermediate Layer)

As shown in FIG. 6, the intermediate layer y can be formed as a thin layer on the anode layer A in a state of covering the anode layer A. In a case of being provided as a thin layer, a thickness thereof can be, for example, about 1 μm to 100 μm, preferably about 2 μm to 50 μm, and more preferably about 4 μm to 25 μm. When the thickness is set as described above, a sufficient performance can be ensured while reducing a cost by reducing a used amount of an expensive material for the intermediate layer. As a material for the intermediate layer y, for example, yttria-stabilized zirconia (YSZ), scandia-stabilized zirconia (SSZ), gadolinium-doped ceria (GDC), yttrium-doped ceria (YDC), samarium-doped ceria (SDC), or the like can be used. In particular, ceria-based ceramics are suitably used.

The intermediate layer y is preferably formed by a low-temperature calcination method (for example, a wet method using a calcination treatment in a low-temperature range without performing a calcination treatment in a high-temperature range of higher than 1,100° C.), a spray coating method (a method such as a thermal spraying method, an aerosol deposition method, an aerosol gas deposition method, a powder jet deposition method, a particle jet deposition method, and a cold spraying method), a PVD method (a sputtering method, a pulsed laser deposition method, or the like), a CVD method, or the like. By these film formation processes which can be used in a low-temperature range, the intermediate layer y can be obtained without using calcination in a high-temperature range of higher than 1,100° C., for example. For the reason, the element interdiffusion between the metal support 1 and the anode layer A can be suppressed without damaging the metal support 1, and a fuel cell element R having excellent durability can be obtained. Moreover, using the low-temperature calcination method is more preferable because handling of raw materials becomes easy.

The intermediate layer y has oxygen ion (oxide ion) conductivity. Moreover, the intermediate layer y more preferably has mixed conductivity of an oxygen ion (oxide ion) and an electron. The intermediate layer y having these properties is suitable for application to the fuel cell element R.

(Electrolyte Layer)

The electrolyte layer B is formed as a thin layer on the intermediate layer y in a state of covering the anode layer A and the intermediate layer y. Moreover, the electrolyte layer B can also be formed as a thin layer having a thickness of 10 μm or less. Specifically, as shown in FIGS. 3 and 6 or the like, the electrolyte layer B is provided over (straddling) the intermediate layer y and the metal support 1. With such a configuration, by boning the electrolyte layer B to the metal support 1, the electrochemical element as a whole can have excellent fastness properties.

In addition, the electrolyte layer B is provided in a region which is on the front side 1e of the metal support 1 and is larger than a region where the through-holes 1a are provided. That is, the through-hole 1a is formed inside a region of the metal support 1 where the electrolyte layer B is formed.

Furthermore, at the periphery of the electrolyte layer B, gas leakage from the anode layer A and the intermediate layer y can be suppressed. Specifically, during power generation, gas is supplied to the anode layer A from the rear side 1f of the metal support 1 through the through-hole 1a.

At a site where the electrolyte layer B is in contact with the metal support 1, gas leakage can be suppressed without providing a separate member such as a gasket. Moreover, in the present embodiment, the electrolyte layer B covers the entire periphery of the anode layer A, but a configuration in which the electrolyte layer B is provided on an upper part of the anode layer A and the intermediate layer y, and a gasket or the like is provided at the periphery may be adopted.

As a material for the electrolyte layer B, yttria-stabilized zirconia (YSZ), scandia-stabilized zirconia (SSZ), gadolinium-doped ceria (GDC), yttrium-doped ceria (YDC), samarium-doped ceria (SDC), strontium- and magnesium-doped lanthanum gallate (LSGM), or the like can be used. In particular, zirconia-based ceramics are suitably used. When the electrolyte layer B is made of the zirconia-based ceramics, an operating temperature of SOFC using the fuel cell element R can be made higher than that in a case of ceria-based ceramics. When SOFC is used, and a system configuration in which a material, such as YSZ, which can exhibit a high electrolyte performance even in a high-temperature range of about 650° C. or higher is used as the material for the electrolyte layer B, a hydrocarbon-based raw fuel such as a city gas and LPG is used as a raw fuel of the system, and the raw fuel is steam-reformed to become a reducing gas of SOFC is adopted, it is possible to construct a highly efficient SOFC system in which heat generated in a cell stack of SOFC is used for reforming the raw fuel gas.

The electrolyte layer B is preferably formed by a low-temperature calcination method (for example, a wet method using a calcination treatment in a low-temperature range without performing a calcination treatment in a high-temperature range of higher than 1,100° C.), a spray coating method (a method such as a thermal spraying method, an aerosol deposition method, an aerosol gas deposition method, a powder jet deposition method, a particle jet deposition method, and a cold spraying method), a PVD method (a sputtering method, a pulsed laser deposition method, or the like), a CVD method, or the like. By these film formation processes which can be used in a low-temperature range, an electrolyte layer B which is dense and has high gastightness and gas barrier properties can be obtained without using calcination in a high-temperature range of higher than 1,100° C., for example. For the reason, the damage of the metal support 1 can be suppressed, the element interdiffusion between the metal support 1 and the anode layer A can be suppressed, and the fuel cell element R which is excellent in a performance and durability can be obtained. In particular, using a low-temperature calcination method, a spray coating method, or the like is preferable because a low-cost element can be obtained. Furthermore, using the spray coating method is more preferable because the electrolyte layer which is dense and has high gastightness and gas barrier properties can be easily obtained in a low-temperature range.

The electrolyte layer B is densely configured so as to shield a gas such as a reducing gas or an oxidizing gas from being leaked and exhibit high ionic conductivity. A denseness of the electrolyte layer B is preferably 90% or greater, more preferably 95% or greater, and still more preferably 98% or greater. When the electrolyte layer B is a uniform layer, the denseness thereof is preferably 95% or greater and more preferably 98% or greater. Moreover, when the electrolyte layer B is formed in a form of a plurality of layers, at least some of these layers preferably include a layer (a dense electrolyte layer) having a denseness of 98% or greater, and more preferably include a layer (a dense electrolyte layer) having a denseness of 99% or greater. This is because when such a dense electrolyte layer is included in a part of the electrolyte layer, the electrolyte layer which is dense and has high gastightness and gas barrier properties can be easily formed even in a case where the electrolyte layer is formed in a form of a plurality of layers.

(Reaction Preventing Layer)

The reaction preventing layer z can be formed as a thin layer on the electrolyte layer B. In a case of being provided as a thin layer, a thickness thereof can be, for example, about 1 μm to 100 μm, preferably about 2 μm to 50 μm, and more preferably about 3 μm to 15 μm. When the thickness is set as described above, a sufficient performance can be ensured while reducing a cost by reducing a used amount of an expensive material for the reaction preventing layer. A material for the reaction preventing layer z may be any material as long as the material can prevent a reaction between the components of the electrolyte layer B and the components of the cathode layer C, but for example, a ceria-based material or the like is used. Moreover, as the material for the reaction preventing layer z, a material containing at least one element selected from the group consisting of Sm, Gd, and Y is suitably used. Furthermore, the material may contain at least one element selected from the group consisting of Sm, Gd, and Y, and a total content ratio of these elements may be 1.0% by mass to 10% by mass. By introducing the reaction preventing layer z between the electrolyte layer B and the cathode layer C, a reaction between the constituent materials of the cathode layer C and the constituent materials of the electrolyte layer B can be effectively suppressed (diffusion suppression), and long-term stability of the performance of the fuel cell element R can be improved. Forming the reaction preventing layer z by appropriately using a method in which the reaction preventing layer z can be formed at a treatment temperature of 1,100° C. or lower is preferable because the damage of the metal support 1 can be suppressed, the element interdiffusion between the metal support 1 and the anode layer A can be suppressed, and the fuel cell element R which is excellent in a performance and durability can be obtained. For example, the formation can be performed by appropriately using a low-temperature calcination method (for example, a wet method using a calcination treatment in a low-temperature range without performing a calcination treatment in a high-temperature range of higher than 1,100° C.), a spray coating method (a method such as a thermal spraying method, an aerosol deposition method, an aerosol gas deposition method, a powder jet deposition method, a particle jet deposition method, and a cold spraying method), a PVD method (a sputtering method, a pulsed laser deposition method, or the like), a CVD method, or the like. In particular, using a low-temperature calcination method, a spray coating method, or the like is preferable because a low-cost element can be obtained. Moreover, using the low-temperature calcination method is more preferable because handling of raw materials becomes easy.

(Cathode Layer)

The cathode layer C can be formed as a thin layer on the electrolyte layer B or the reaction preventing layer z. In a case of being provided as a thin layer, a thickness thereof can be, for example, about 1 μm to 100 μm and preferably 5 μm to 50 μm. When the thickness is set as described above, a sufficient electrode performance can be ensured while reducing a cost by reducing a used amount of an expensive material for the cathode layer. As a material for the cathode layer C, for example, a complex oxide such as LSCF and LSM, a ceria-based oxide, and a mixture thereof can be used. In particular, the cathode layer C preferably contains a perovskite-type oxide containing two or more elements selected from the group consisting of La, Sr, Sm, Mn, Co, and Fe. The cathode layer C formed of the above materials functions as a cathode.

In addition, forming the cathode layer C by appropriately using a method in which the cathode layer C can be formed at a treatment temperature of 1,100° C. or lower is preferable because the damage of the metal support 1 can be suppressed, the element interdiffusion between the metal support 1 and the anode layer A can be suppressed, and the fuel cell element R which is excellent in a performance and durability can be obtained. For example, the formation can be performed by appropriately using a low-temperature calcination method (for example, a wet method using a calcination treatment in a low-temperature range without performing a calcination treatment in a high-temperature range of higher than 1,100° C.), a spray coating method (a method such as a thermal spraying method, an aerosol deposition method, an aerosol gas deposition method, a powder jet deposition method, a particle jet deposition method, and a cold spraying method), a PDV method (a sputtering method, a pulsed laser deposition method, or the like), a CVD method, or the like. In particular, using a low-temperature calcination method, a spray coating method, or the like is preferable because a low-cost element can be obtained. Moreover, using the low-temperature calcination method is more preferable because handling of raw materials becomes easy.

In the fuel cell single unit U, electrical conduction properties between the metal support 1 and the anode layer A are ensured. Moreover, an insulating coating film may be formed on a required portion of the surface of the metal support 1, as needed.

<Power Generation in Fuel Cell Element>

The fuel cell element R receives supply of both a reducing gas containing hydrogen and an oxidizing gas containing oxygen to generate power. As described above, by supplying both the gases to respective electrode layers (the anode layer A and the cathode layer C) of the fuel cell element R, as shown in FIG. 6, in the cathode layer C, an oxygen molecule $O_2$ reacts with an electron $e^-$ to produce an oxygen ion $O^{2-}$. The oxygen ion $O^{2-}$ moves to the anode layer A through the electrolyte layer B. In the anode layer A, each of (hydrogen $H_2$ and carbon monoxide CO), which are the fuel gas for power generation, reacts with an oxygen ion $O^{2-}$ to produce steam $H_2O$, carbon dioxide $CO_2$, and an electron $e^-$. By the above reaction, an electromotive force is generated between the anode layer A and the cathode layer C to perform power generation. The power generation principle is the same also in the second embodiment (see FIG. 11).

Hereinafter, a structure for supplying the reducing gas and the oxidizing gas will be described, and a configuration relating to internal reforming unique to the present invention will be described.

As shown in FIGS. 3(*a*) and 3(*b*), the fuel cell single unit U is configured to include the current-collector plate 3 with projections as a metal separator. As shown in FIG. 4(*a*), the current-collector plate 3 with projections is a plate which is made of a metal and has a disc shape, has a concave-convex structure site 3*a* including one or more concave portions or convex portions, is disposed so as to face the rear side 1*f* of the metal support 1, and is bonded to the metal support 1 via a bonding site W. The concave-convex structure site 3*a* is connected to the cathode layer C of another fuel cell single unit U when the plurality of the fuel cell single units U are stacked. Therefore, the current-collector plate 3 with projections is electrically connected to the metal support 1, and further to the anode layer A. In the current-collector plate 3 with projections, a gas does not flow between front and back thereof. As will be described later, the metal support 1 side (in other words, an anode layer A side) of the current-collector plate 3 with projections can be the reducing gas supply path L1 described above, and a rear side (a side spaced from the metal support 1) thereof can be the oxidizing gas supply path L2 described above.

The supply and the discharge of these gases will be described below.

The fuel cell single unit U includes a gas supply pipe 2.

The gas supply pipe 2 separately supplies the reducing gas and the oxidizing gas to spaces (each serving as a supply path through which a gas flows outward in a radial direction) formed above and below the current-collector plate 3 with projections. The gas supply pipe 2 is a member which is made of a metal and has a cylindrical shape, and is inserted into the opening part 1*b* of the metal support 1 in a state where a central axis Z of the gas supply pipe 2 is aligned with a central axis Z of the metal support 1 and fixed by welding. Moreover, the metal support 1 may be biased against the gas supply pipe 2 with a seal material sandwiched therebetween. As a material for the gas supply pipe 2, the same material as that for the metal support 1 described above can be used. Furthermore, forming a diffusion preventive layer, which is the same as that for the metal support 1, on a surface of the gas supply pipe 2 is suitable because Cr scattering can be suppressed.

In addition, the gas supply pipe 2 may have a sufficient strength for configuring the fuel cell single unit U and the fuel cell module M described later. Moreover, a sintered metal, a foamed metal, or the like can also be used for the gas supply pipe 2, but in this case, a treatment such as surface coating may be applied in order to prevent gas permeation.

The gas supply pipe 2 has a partition wall 2*a* which is disposed inside thereof in parallel with the central axis Z, and is partitioned into a first flow path 2*b* and a second flow path 2*c*. The first flow path 2*b* and the second flow path 2*c* have a form in which a gas does not flow between both flow paths so that different gases can flow through the respective flow paths.

A first flow hole 2*d* and a second flow hole 2*e*, which penetrate the inside and the outside, are formed in the gas supply pipe 2. The first flow hole 2*d* connects a space (serving as the reducing gas supply path L1 of the present invention) between the metal support 1 and the current-collector plate 3 with projections to the first flow path 2*b* so that a gas can flow between the both. The second flow hole 2*e* connects a space (serving as the oxidizing gas supply path L2 of the present invention) on a side opposite to the metal support 1 with respect to the current-collector plate 3 with projections to the second flow path 2*c* so that a gas can flow between the both. The first flow hole 2*d* and the second flow hole 2*e* are formed at different positions in a direction along the central axis Z of the gas supply pipe 2, and are formed on both sides of the current-collector plate 3 with projections sandwiched therebetween.

Therefore, in the present embodiment, the first flow path 2*b* is connected to the reducing gas supply path L1 formed on an upper side of the current-collector plate 3 with projections, and the second flow path 2*c* is connected to the oxidizing gas supply path L2 formed on a lower side of the current-collector plate 3 with projections.

As shown in FIGS. 4(*a*)-4(*c*), in the current-collector plate 3 with projections, a plurality of the concave-convex structure sites 3*a* are formed so as to project in a vertical direction from a disc surface of the current-collector plate 3 with projections. The concave-convex structure site 3a has a vertex having a gentle conical shape.

As shown in FIGS. 3(a) and 3(b), the current-collector plate 3 with projections is disposed so as to face the rear side 1f of the metal support 1, and is bonded to the metal support 1 via the bonding site W. For example, the current-collector plate 3 with projections can be directly biased against and bonded to the metal support 1, but in this case, a portion where the vertex of the concave-convex structure site 3a and the metal support 1 contact each other serves as the bonding site W. Moreover, the current-collector plate 3 with projections can be biased against and bonded to the metal support 1 with the bonding site W which is formed by applying a ceramic paste or the like having excellent conductivity to the vertex of the concave-convex structure site 3a, or the current-collector plate 3 with projections can be biased against and bonded to the metal support 1 with a metal felt or the like which is sandwiched between the current-collector plate 3 with projections and the metal support 1. Alternatively, the current-collector plate 3 with projections and the metal support 1 can be boned to each other while forming the bonding site W by brazing a part or the whole of the vertex of the concave-convex structure site 3a. In addition, the current-collector plate 3 with projections is disposed so that the gas supply pipe 2 passes through an opening part 3b. The current-collector plate 3 with projections and the gas supply pipe 2 are bonded to each other by welding at the periphery of the opening part 3b. Furthermore, the current-collector plate 3 with projections may be biased against the gas supply pipe 2 with a seal material sandwiched therebetween.

As a material for the current-collector plate 3 with projections, the same material as that for the metal support 1 described above can be used. Moreover, forming a diffusion preventive layer, which is the same as that for the metal support 1, on a surface of the current-collector plate 3 with projections is suitable because Cr scattering can be suppressed. The current-collector plate 3 with projections configured as described above can be manufactured at a low cost by press molding or the like. Furthermore, the current-collector plate 3 with projections is made of a material, which does not allow a gas to permeate, so that a gas cannot flow between the front side 1e and the rear side 1f.

With this structure, the current-collector plate 3 with projections as the metal separator is electrically connected to the anode layer A, which configures the fuel cell element R, via the metal support 1. As will be described later, in a state where the fuel cell single units U are stacked to form the fuel cell module M, the current-collector plate 3 with projections is also electrically connected to the cathode layer C.

The current-collector plate 3 with projections may have a sufficient strength for configuring the fuel cell single unit U and the fuel cell module M described later, and the current-collector plate 3 with projections having a thickness of, for example, about 0.1 mm to 2 mm, preferably about 0.1 mm to 1 mm, and more preferably about 0.1 mm to 0.5 mm can be used. Moreover, in addition to the metal plate, a sintered metal, a foamed metal, or the like can also be used for the current-collector plate 3 with projections, but in this case, a treatment such as surface coating may be applied in order to prevent gas permeation.

<Gas Supply>

As described above, the current-collector plate 3 with projections has the concave-convex structure site 3a, and the vertex of the concave-convex structure site 3a is bonded to the rear side 1f of the metal support 1. In the structure, a disc-shaped (doughnut-shaped) space (the reducing gas supply path L1) which is axisymmetric with respect to the central axis Z is formed between the metal support 1 and the current-collector plate 3 with projections. A reducing gas is supplied to the supply path L1 from the first flow path 2b through the first flow hole 2d of the gas supply pipe 2. As a result, the reducing gas is supplied to the through-hole 1a of the metal support 1 and then to the anode layer A.

Similarly, by bonding the vertex of the concave-convex structure site 3a of the current-collector plate 3 with projections to the cathode layer C of the fuel cell single unit U positioned on the lower side, a space (the oxidizing gas supply path L2) in which a gas can be supplied to the cathode layer C through the second flow hole 2e of the gas supply pipe 2 is formed.

Hereinbefore, the basic configuration of the fuel cell according to the present invention has been described, but hereinafter, the feature configurations of the present invention will be described mainly with reference to FIGS. 5 and 6.

As also described above, in the present embodiment, the reducing gas supply path L1 for supplying a gas containing hydrogen to the anode layer A is formed between the current-collector plate 3 with projections and the metal support 1. Moreover, as also indicated by an arrow in FIG. 5, the gas flowing through the supply path L1 is directed in one direction from the side of the gas supply pipe 2 positioned on a center side of the disc to a radially outward side. Furthermore, hydrogen for a power generation reaction can be supplied to the anode layer A through the through-hole 1a, which is provided so as to penetrate the front and rear of the metal support 1.

Here, the power generation reaction in the fuel cell element R is as described above, but due to the reaction, steam $H_2O$ is released from the anode layer A to the through-hole 1a and the reducing gas supply path L1. As a result, the reducing gas supply path L1 of the present invention serves as a supply unit for supplying a gas containing hydrogen $H_2$ to the anode layer A, and also serves as a discharge destination of steam $H_2O$.

Figure 5:
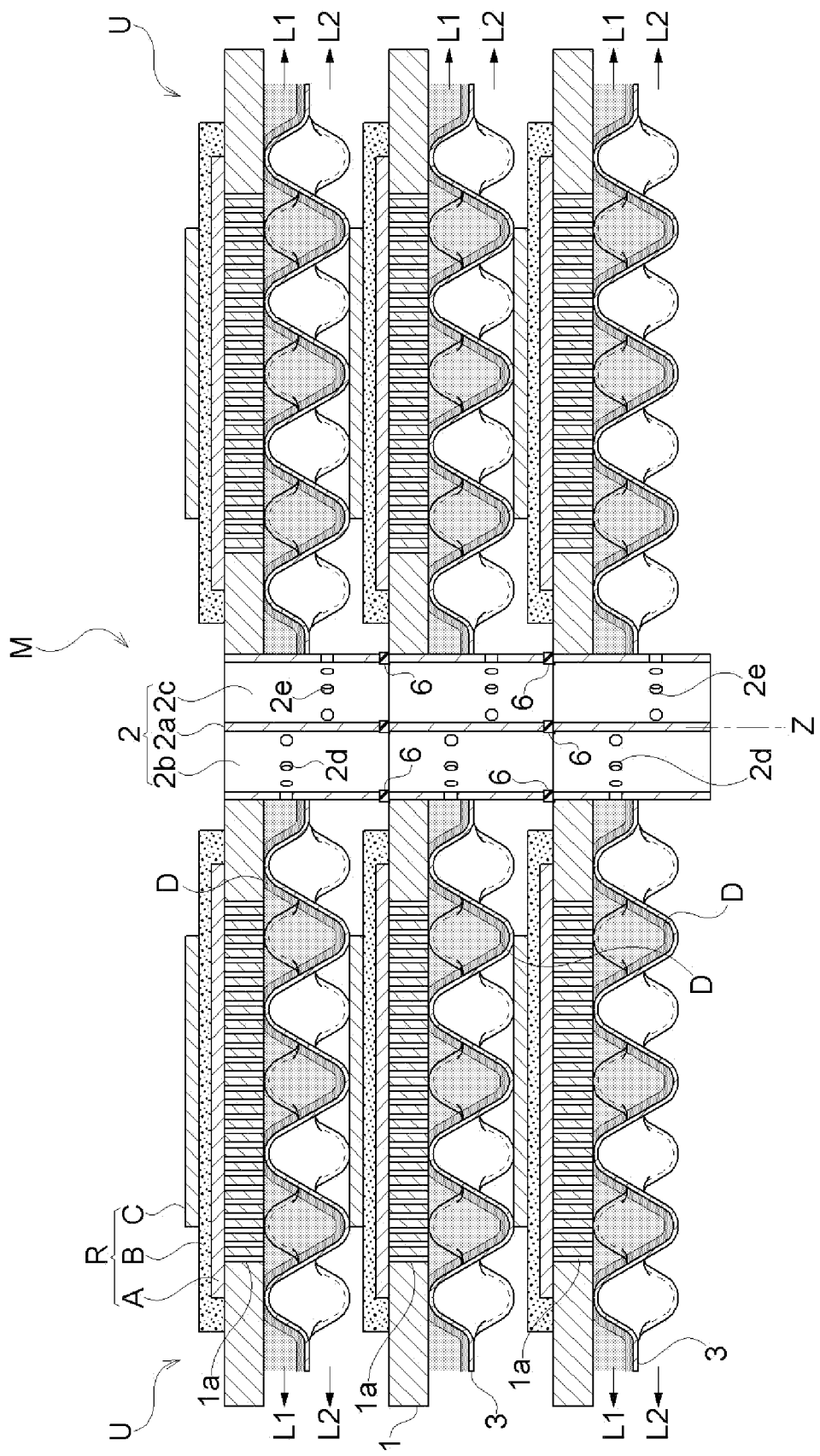
FIG. 5 is a cross-sectional view showing a structure of a fuel cell module according to the first embodiment.

Therefore, in the present invention, as shown in FIGS. 5 and 6, the internal reforming catalyst layer D is provided on the surface (the surface on the metal support 1 side) of the current-collector plate 3 with projections on the side of the reducing gas supply path L1.

As also described above, in addition to hydrogen $H_2$ obtained by external reforming, a raw fuel gas (the gas which is not yet reformed: in the illustrated example, methane $CH_4$) to be reformed flows through the reducing gas supply path L1, but by returning steam $H_2O$ produced in the anode layer A to the reducing gas supply path L1, the steam $H_2O$ can flow into the supply path L1 to reform a fuel gas $CH_4$. Needless to say, the produced hydrogen $H_2$ or carbon monoxide CO can be supplied to the anode layer A through the through-hole 1a on a downstream side, and provided for power generation.

As a material for the internal reforming catalyst layer D, for example, a large number of ceramic-made porous granular materials holding a reforming catalyst such as nickel, ruthenium, and platinum can be formed in an air-permeable state.

In addition, when the internal reforming catalyst layer D contains Ni, a content of Ni can be in a range of 0.1% by mass to 50% by mass. Moreover, the content of Ni when the internal reforming catalyst layer D contains Ni is more preferably 1% by mass or greater and still more preferably 5% by mass or greater. This is because a higher internal reforming performance can be obtained by setting the content as described above. On the other hand, the content of Ni when the internal reforming catalyst layer D contains Ni is more preferably 45% by mass or less and still more preferably 40% by mass or less. This is because the cost of the fuel cell device can be further reduced by setting the content as described above. Moreover, it is also preferable that Ni is supported on a support. Furthermore, the internal reforming catalyst layer D is preferably formed by a low-temperature calcination method (for example, a wet method using a calcination treatment in a low-temperature range without performing a calcination treatment in a high-temperature range of higher than 1,100° C.), a spray coating method (a method such as a thermal spraying method, an aerosol deposition method, an aerosol gas deposition method, a powder jet deposition method, a particle jet deposition method, and a cold spraying method), a PVD method (a sputtering method, a pulsed laser deposition method, or the like), a CVD method, or the like. This is because by these processes which can be used in a low-temperature range, a favorable internal reforming catalyst layer D can be obtained while suppressing damage due to high-temperature heating of the reducing gas supply path L1 (for example, the metal support 1 and the current-collector plate 3 with projections) provided with the internal reforming catalyst layer D, and the fuel cell single unit U having excellent durability can be obtained. Moreover, forming the internal reforming catalyst layer D after the diffusion suppressing layer x is formed on the surface of the metal support 1 or the current-collector plate 3 with projections is preferable because scattering of Cr from the metal support 1 or the current-collector plate 3 with projections can be suppressed.

For example, a thickness of such an internal reforming catalyst layer D is preferably 1 μm or greater, more preferably 2 μm or greater, and still more preferably 5 μm or greater. This is because by setting the thickness as described above, a contact area with a fuel gas or steam is increased and thus an internal reforming conversion rate can be increased. Moreover, for example, the thickness is preferably 500 μm or less, more preferably 300 μm or less, and still more preferably 100 μm or less. This is because by setting the thickness as described above, a used amount of an expensive material for the internal reforming catalyst layer can be reduced to reduce a cost.

Returning to FIG. 6 again, the steam reforming reaction in the internal reforming catalyst layer D will be briefly described. As shown in the same drawing, by providing the internal reforming catalyst layer D in the fuel cell single unit U, the raw fuel gas $CH_4$ supplied to the reducing gas supply path L1 can be reformed as follows to produce hydrogen $H_2$ and carbon monoxide CO which serve as a fuel gas for power generation. The reforming reaction is the same also in the embodiment shown in FIG. 11.

$$CH_4 + H_2O \rightarrow CO + 3H_2 \quad \text{[Chem. 1]}$$

$$CO + H_2O \rightarrow CO_2 + H_2 \quad \text{[Chem. 2]}$$

$$CH_4 + 2H_2O \rightarrow CO_2 + 4H_2 \quad \text{[Chem. 3]}$$

A temperature of the reducing gas supply path L1 (the internal reforming catalyst layer D) is practically 600° C. to 900° C., which is the operating temperature of the fuel cell element R. A structure which schematically shows the functional configuration of the fuel cell single unit U, as a fuel cell, according to the first embodiment described above is a structure shown in FIG. 19(a).

In the above description, the outline of the fuel cell module M in the first embodiment is described. The structure of the fuel cell module M in this embodiment will be specifically described.

As shown in FIG. 5, the fuel cell module M according to the first embodiment is configured by stacking the plurality of the fuel cell single units U. That is, the fuel cell module M is configured by stacking the plurality of the fuel cell single units U with a gasket 6 sandwiched therebetween. The gasket 6 is disposed between the gas supply pipe 2 of one fuel cell single unit U and the gas supply pipe 2 of another fuel cell single unit U. Moreover, the gasket 6 electrically insulates the metal support 1, the gas supply pipe 2, and the current-collector plate 3 with projections of one fuel cell single unit U from the metal support 1, the gas supply pipe 2, and the current-collector plate 3 with projections of another fuel cell single unit U. Furthermore, the gasket 6 airtightly maintains a connection site (a connection site of the gas supply pipe 2) of the fuel cell single unit U so that a gas flowing through the first flow path 2b and the second flow path 2c of the gas supply pipe 2 is not leaked or mixed. The gasket 6 is formed, for example, by using vermiculite, mica, alumina, or the like as a material so that the electrical insulation and the airtight maintenance are possible.

In addition, as described above, the current-collector plate 3 with projections electrically connects the metal support 1 of one fuel cell single unit U to the cathode layer C. Therefore, in the fuel cell single unit U according to the present embodiment, the fuel cell elements R of respective fuel cell single units U are electrically connected in series.

The gas flow in the fuel cell module M has already been described.

A configuration form of the reducing gas supply path L1 may be the current-collector plate 3 with projections having a shape shown in FIG. 4(a), or may be as shown in FIG. 4(b) or FIG. 4(c). In these configurations, a common technical element may be a configuration in which a reducing gas (specifically, a mixed gas of a gas, which is not yet reformed, and a reformed gas) containing hydrogen and an oxidizing gas (specifically, an air) which is a gas containing oxygen move to an outer diameter side and are exhausted as an exhaust gas.

In the present invention, the reducing gas supply path L1 flows from the supply side of the mixed gas to the discharge side, and a gas containing hydrogen $H_2$ flows to the anode layer A through the plurality (a large number) of the through-holes 1a provided therebetween. Moreover, by returning steam $H_2O$ produced in the anode layer A to the internal reforming catalyst layer D, the steam reforming is performed to produce hydrogen and carbon monoxide which are fuel gases for power generation, the fuel gas for power generation containing hydrogen $H_2$ is supplied to the anode layer A from the through-hole 1a positioned on the downstream side, and thus power generation can be performed. Therefore, such a gas path is referred to as an internal reformed fuel supply path L3, a discharge side of the produced steam $H_2O$ is referred to as a discharge unit L3a, and a supply side of hydrogen $H_2$ subjected to internal reforming is referred to as a supply unit L3b. The discharge unit L3a is also the steam supply path of the present invention. Furthermore, the discharge unit L3a can also simultaneously function as the supply unit L3b, and the supply unit L3b can also simultaneously function as the discharge unit L3a.

Second Embodiment

Hereinafter, a fuel cell device Y, a fuel cell module M, and a fuel cell single unit U according to the second embodiment will be described with reference to the drawings.

<Fuel Cell Device>

Figure 7:
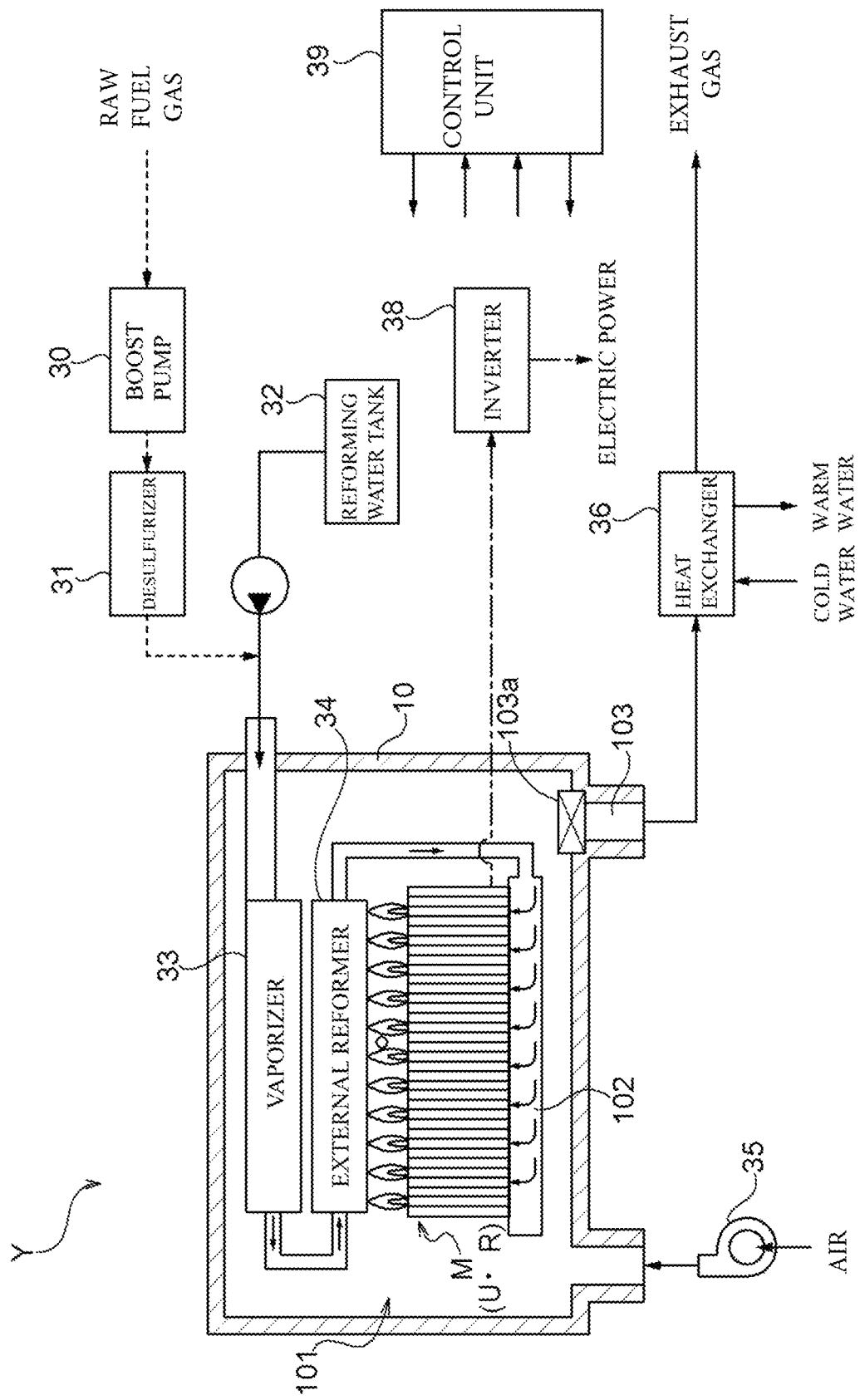
FIG. 7 is a diagram showing a configuration of a fuel cell device according to a second embodiment.

FIG. 7 shows an outline of the fuel cell device Y.

The fuel cell device Y is also configured to include the fuel cell module M, and a power generation operation is performed by a reducing gas containing hydrogen and an oxidizing gas containing oxygen, which are supplied to the fuel cell module M.

Figure 8:
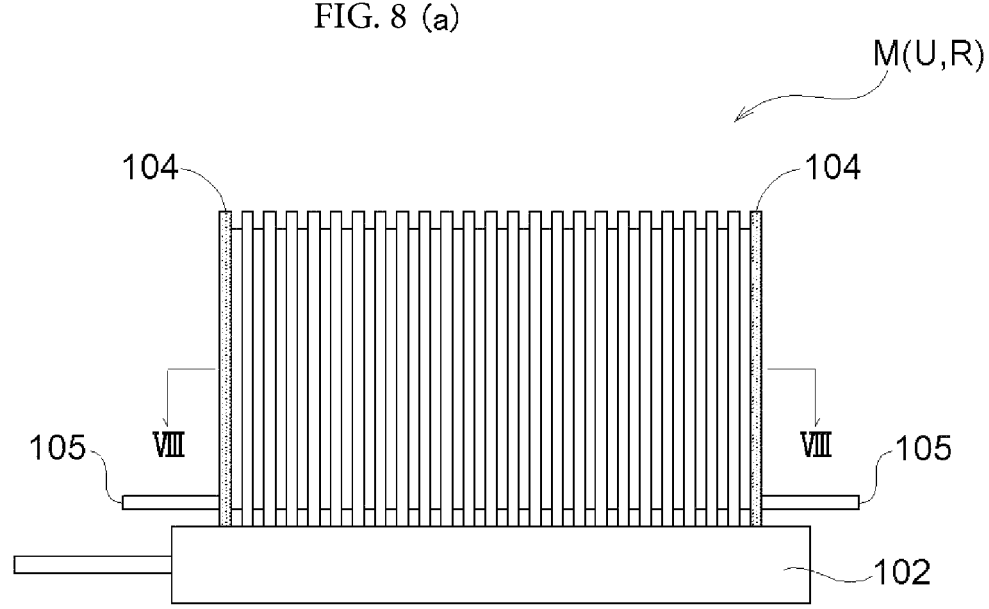
FIGS. 8(a) and 8(b) are a front view and a plane cross-sectional view showing a structure of a fuel cell module according to the second embodiment.
Figure 8:
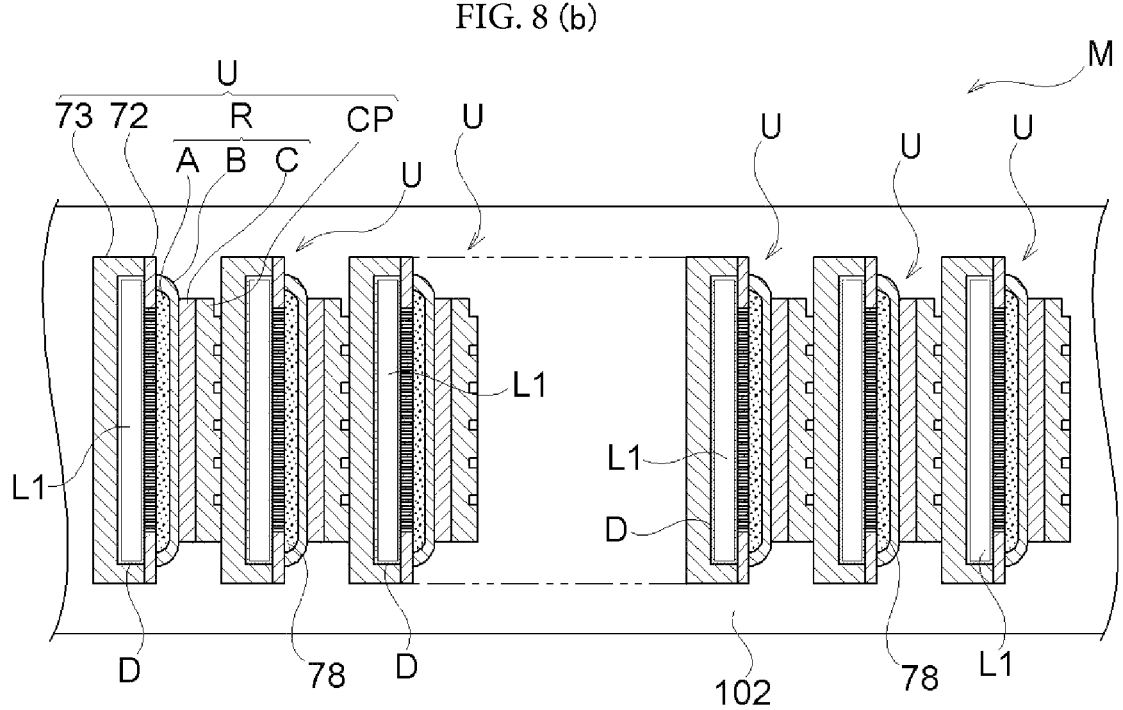

As shown in FIGS. 7, 8(a), and 8(b), the fuel cell module M is formed in a form of a substantially rectangular parallelepiped, and is configured to include the fuel cell module M, an external reformer 34, a vaporizer 33, and the like in one housing 10. Functions of respective machines (a boost pump 30, a desulfurizer 31, a reforming water tank 32, the vaporizer 33, and the external reformer 34) included in a supply system of the reducing gas are the same as those in the first embodiment described above. However, since the external reformer 34 and the vaporizer 33 are positioned in the housing 10 housing the fuel cell module M, heat of the fuel cell module M is effectively utilized.

The fuel cell module M according to the second embodiment is provided with a combustion unit 101 for an exhaust gas containing hydrogen on an upper part thereof, residual combustion components (specifically, hydrogen, carbon monoxide, and methane) contained in the exhaust gas of the fuel cell can be combusted at the site 101, and heat of the combustion can be utilized for steam reforming and vaporization.

Functions of an inverter 38, a control unit 39, and a heat exchanger 36 are the same as those in the previous embodiment.

Therefore, also in the second embodiment, the fuel cell device Y is a so-called "cogeneration system", which is capable of generating and supplying both electric power and heat.

Incidentally, the supply of the reducing gas containing hydrogen and the supply of the oxidizing gas containing oxygen with respect to respective electrode layers (an anode layer A and a cathode layer C) included in the fuel cell single unit U or the fuel cell element R have a configuration unique to this embodiment.

The outline thereof will be described with reference to FIGS. 7 and 11. A gas manifold 102 is provided on the downstream side of the external reformer 34, a gas (a raw fuel gas), which is not yet reformed, and a reformed gas are distributed and supplied to the reducing gas supply path L1 included in the fuel cell single unit U, and the reducing gas containing hydrogen is supplied to the anode layer A from the supply path L1.

On the other hand, in the supply of the oxygen to an oxidizing gas supply path L2, an air is sucked by a blower 35 into the housing 10, and the sucked oxidizing gas containing oxygen is supplied to the cathode layer C through the oxidizing gas supply paths L2 respectively provided in the fuel cell single unit U and a current-collector plate CP. In this embodiment, the combustion unit 101 is provided between the fuel cell module M and the external reformer 34, but the air sucked by the blower 35 is also utilized for combustion of the residual fuel in the combustion unit 101.

As described above, the exhaust gas generated by the predetermined cell reaction and combustion reaction is sent to the heat exchanger 36, and is provided for predetermined heat utilization. Here, a machine 103a provided at an exhaust port 103 of the housing 10 is a machine for treating an exhaust gas.

<Fuel Cell Module M>

Next, the fuel cell module M will be described with reference to FIGS. 8(a) and 8(b).

FIG. 8(a) shows a side view of the fuel cell module M, and FIG. 8(b) shows a cross-sectional view (VIII-VIII cross section of FIG. 8(a)) thereof.

In this embodiment, the fuel cell module M is configured by stacking a plurality of the fuel cell single units U in a lateral direction (a right-left direction of FIGS. 8(a) and 8(b)). Specifically, each of the fuel cell single units U can be installed upright on the gas manifold 102 described above. That is, the fuel cell module M is constructed by erecting the metal support 1 supporting the fuel cell element R on the gas manifold 102.

In the second embodiment, the metal support 1 is formed in a tubular shape so as to be provided with the reducing gas supply path L1 extending in a vertical direction in an erected state. On the other hand, since the current-collector plate CP having a concave-convex shape is provided so as to be electrically connected to the metal support 1, and the current-collector plate CP has air permeability, an oxidizing gas (specifically, an air) sucked to a peripheral part of the fuel cell module M is allowed to reach the cathode layer C of the fuel cell element R (see FIG. 11).

As shown in FIGS. 8(a) and 8(b), the fuel cell module M is configured to include the plurality of the fuel cell single units U, the gas manifold 102, the current-collector plate CP, a terminal member 104, and a current drawing unit 105.

The fuel cell single unit U is configured to include the fuel cell element R on one surface of the metal support 1 which is a hollow tube, and has a long flat plate shape or a flat bar shape as a whole. Moreover, one end part of the fuel cell single unit U in a longitudinal direction is fixed to a gas manifold 102 with an adhesive member such as a glass seal material. The metal support 1 is electrically insulated from the gas manifold 102.

The fuel cell element R is configured in a form of a thin film or layer (in the present invention, a form including the both is referred to as a "thin layer shape") as a whole. There is no difference in that also in this embodiment, the fuel cell element R is configured to include the anode layer A, an electrolyte layer B, and the cathode layer C. The matter in which a metal oxide layer x, an intermediate layer y, and a reaction preventing layer z described above are provided is also the same. The metal oxide layer x, the intermediate layer y, and the reaction preventing layer z are shown in FIG. 11.

In the second embodiment, the plurality of the fuel cell single units U are stacked in a state where a back surface of the metal support 1 of one fuel cell single unit U is in contact with the current-collector plate CP of another fuel cell single unit U, and thus a predetermined electrical output can be taken out.

For the current-collector plate CP, a member having conductivity, gas permeability, and elasticity in a direction of stacking and parallel arrangement of the fuel cell single units U is used. For example, an expanded metal using a metal foil, a metal mesh, or a felt-like member is used for the current-collector plate CP. Therefore, the air supplied from the blower 35 can permeate or flow through the current-collector plate CP to be supplied to the cathode layer C of the fuel cell element R. In the present invention, a flow path which configures the fuel cell single unit U and passes through the current-collector plate CP and through which a gas containing oxygen flows is referred to as the oxidizing gas supply path L2 (see FIG. 11).

In addition, since the current-collector plate CP has elasticity in a direction of parallel arrangement of the fuel cell single units U, the metal support 1 cantilevered by the gas manifold 102 can also be displaced in the direction of the parallel arrangement, and robustness of the fuel cell module M against disturbances such as vibration and temperature change is enhanced.

The plurality of the fuel cell single units U arranged in parallel are sandwiched between a pair of the terminal members 104. The terminal member 104 is a member which has conductivity and is elastically deformable, and a lower end thereof is fixed to the gas manifold 102. The current drawing unit 105 extending outward in the direction of the parallel arrangement of the fuel cell single unit U is connected to the terminal member 104. The current drawing unit 105 is connected to the in the inverter 38, and sends a current generated by the power generation of the fuel cell element R to the inverter 38.

<Fuel Cell Single Unit U>

Figure 9:
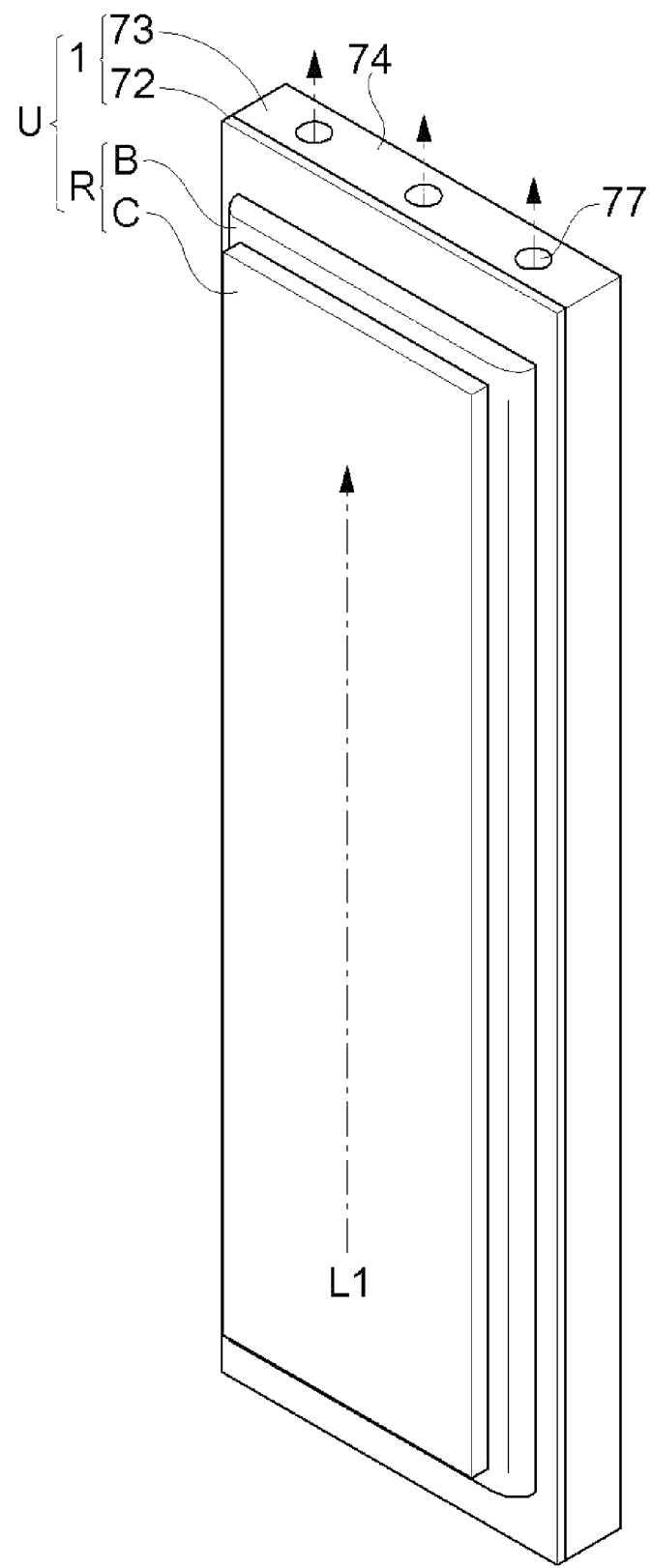
FIG. 9 is a perspective view showing a structure of a fuel cell single unit according to a second embodiment.
Figure 10C:
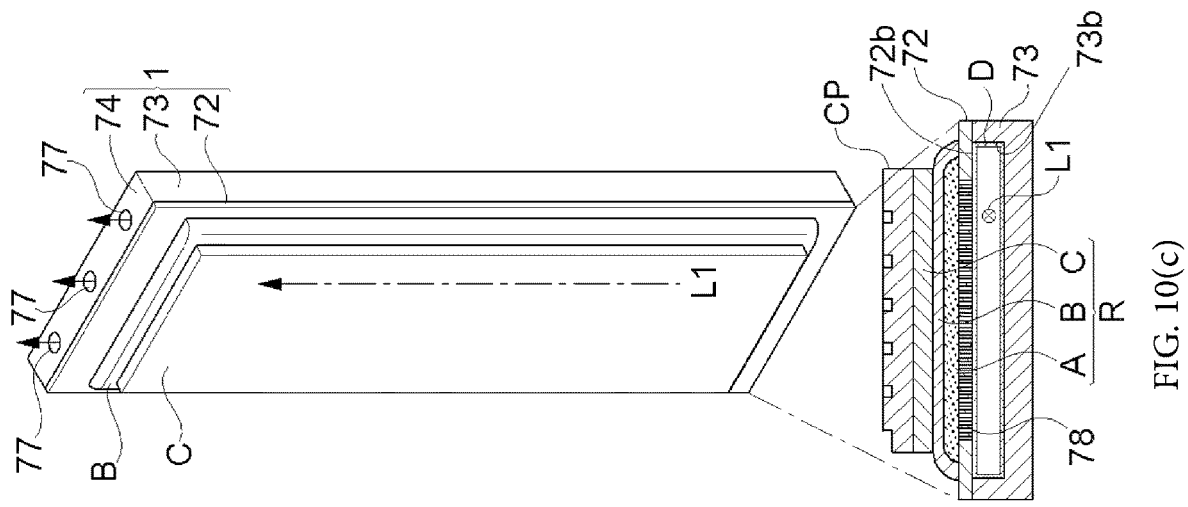
FIGS. 10(a)-10(c) are explanatorys view of a process of forming the fuel cell single unit according to the second embodiment.
Figure 10B:
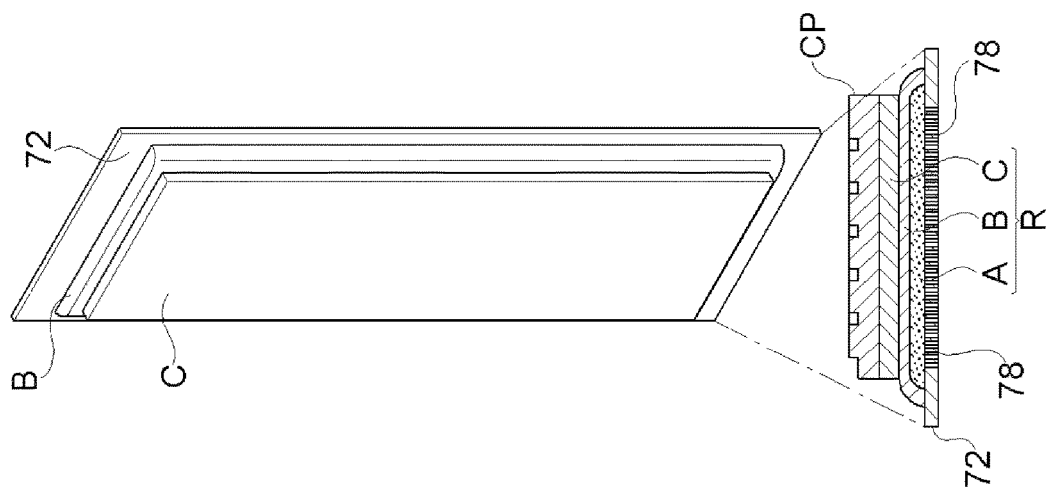
Figure 10A:
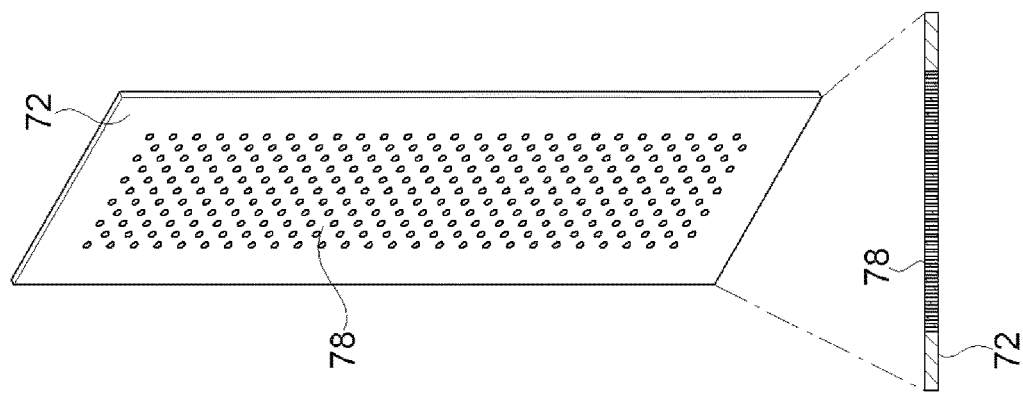

FIGS. 9, 10(*a*), 10(*b*), and 10(*c*) show a schematic configuration of the fuel cell single unit U according to the second embodiment.

FIG. 9 is a perspective view of the fuel cell single unit U, and FIGS. 10(*a*)-10(*c*) show a forming procedure of the unit U.

As also described above, the fuel cell single unit U is configured to include the metal support 1 having conductivity and the fuel cell element R, and the fuel cell element R is configured to have the anode layer A and the cathode layer C which are formed with the electrolyte layer B interposed therebetween.

<Metal Support 1>

The metal support 1 is configured to include a rectangular flat plate member 72, a U-shaped member 73 of which cross section orthogonal to a longitudinal direction has a U shape, and a lid part 74. A long side of the flat plate member 72 and a long side of the U-shaped member 73 (sides corresponding to two U-shaped vertexes) are bonded to each other, and one end part (in the drawing, an upper end side) is closed by the lid part 74. Therefore, the metal support 1 which has a flat plate shape or a flat bar shape as a whole and has a space inside is formed. The flat plate member 72 is disposed parallel to the central axis of the metal support 1.

An internal space of the metal support 1 serves as the reducing gas supply path L1 described above. The lid part 74 is provided with an exhaust gas discharge port 77 for discharging a gas flowing through the reducing gas supply path L1 to the outside of the metal support 1. A discharge side (an upper side) of the exhaust gas discharge port 77 serves as the combustion unit 101 described above. An end part on a side (which is a lower side, and a site connected to the gas manifold 102 described above) opposite to the end part where the lid part 74 is provided is opened, and thus serves as the inlet of the reducing gas supply path L1.

As materials for the flat plate member 72, the U-shaped member 73, and the lid part 74, materials having excellent conductivity, heat resistance, oxidation resistance, and corrosion resistance are used. For example, ferritic stainless steel, austenitic stainless steel, a nickel-based alloy, or the like is used. That is, the metal support 1 is robustly configured. In particular, ferritic stainless steel is suitably used.

When the ferritic stainless steel is used as the material for the metal support 1, a thermal expansion coefficient of the metal support 1 is close to that of yttria-stabilized zirconia (YSZ) or gadolinium-doped ceria (GDC, also referred to as CGO) used as a material in the fuel cell element R. Therefore, even when a temperature cycle of a low temperature and a high temperature is repeated, the fuel cell single unit U is less likely to be damaged. Accordingly, a fuel cell element R having excellent long-term durability can be obtained, which is preferable.

In addition, as the material for the metal support 1, a material having a thermal conductivity of greater than 3 $Wm^{-1}K^{-1}$ is preferably used, and a material having a thermal conductivity of greater than 10 $Wm^{-1}K^{-1}$ is more preferable. For example, since stainless steel has a thermal conductivity of about 15 to 30 $Wm^{-1}K^{-1}$, the stainless steel is suitable as the material for the metal support 1.

Furthermore, as the material for the metal support 1, a high toughness material which does not cause brittle fracture is more desirable. A metal material has high toughness compared to a ceramic material or the like, and is suitable as the metal support 1.

As is also clear from FIGS. 10(*a*)-10(*c*), the flat plate member 72 is provided with a plurality of through-holes 78 penetrating the front surface and the rear surface of the flat plate member 72. A gas can flow between the inside and the outside of the metal support 1 through the through-hole 78. On the other hand, in a region of the flat plate member 72 or the U-shaped member 73 where the through-holes 78 are not provided, a gas cannot flow between the inside and the outside of the metal support 1.

Hereinbefore, the basic configuration of the fuel cell according to the present invention has been described, but hereinafter, the feature configurations of the present invention will be described mainly with reference to FIGS. 10(*a*)-10(*c*) and 11.

As also described above, in the present embodiment, the reducing gas supply path L1 for supplying a gas containing hydrogen to the anode layer A is formed in the metal support 1. Moreover, as also indicated by an alternate long and short dash line arrow in FIG. 9, the gas in the supply path L1 is directed in one direction from an axial opening side (a lower side) of the metal support 1 to an axial lid part side (an upper side). Hydrogen $H_2$ for a power generation reaction can be supplied to the anode layer A through the through-hole 78, which is provided so as to penetrate the front and rear of the flat plate member 72. Here, the power generation reaction in the fuel cell element R is as described above, but due to the reaction, steam $H_2O$ is released from the anode layer A to the through-hole 78. As a result, a part of the through-hole 78 and the reducing gas supply path L1 of the present embodiment serves as a supply unit L3*b* for supplying a gas containing hydrogen $H_2$, and also serves as a discharge unit L3*a* of steam $H_2O$.

Figure 11:
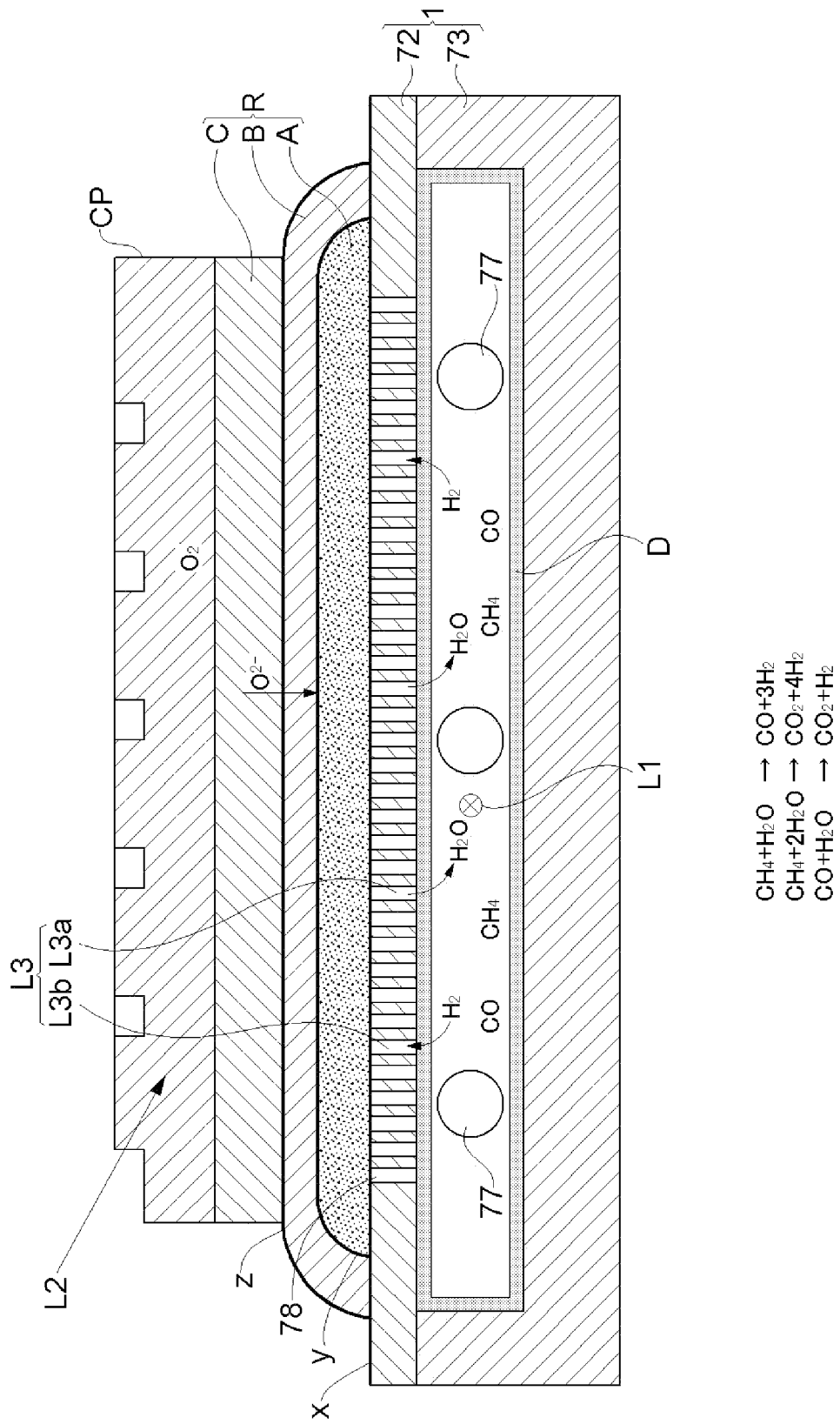
FIG. 11 is an explanatory view of a cell reaction and a reforming reaction in the second embodiment.

Accordingly, as shown in FIGS. 10 and 11, the internal reforming catalyst layer D is provided on a rear surface 72*b* of the flat plate member 72 and an inner surface 73*b* of the metal support 1.

As also described above, in addition to hydrogen obtained by external reforming, a gas (which is a raw fuel gas, and in the illustrated example, methane $CH_4$), which is not yet reformed, to be reformed flows through the reducing gas supply path L1, but by returning steam $H_2O$ produced in the anode layer A to the internal reforming catalyst layer D, steam reforming is performed, hydrogen $H_2$ is supplied to the anode layer A from the through-hole 78 positioned on the downstream side (in a case of FIG. 11, a rear side of the paper), and thus power generation can be performed. Therefore, the matter in which the internal reformed fuel supply path L3 according to the present invention includes the discharge unit L3*a* of the produced steam $H_2O$ and the supply unit L3*b* of hydrogen $H_2$ subjected to internal reforming is the same as in the first embodiment. Furthermore, the discharge unit L3*a* can also simultaneously function as the supply unit L3*b*, and the supply unit L3*b* can also simultaneously function as the discharge unit L3*a*. The discharge unit L3*a* serves as the steam supply path.

A material for the internal reforming catalyst layer D, a thickness thereof, and the like are the same as described above.

By adopting such a structure, in the metal support 1, steam $H_2O$ discharged from the anode layer A is utilized to cause steam reforming, and hydrogen $H_2$ and carbon monoxide CO obtained by the reforming can be supplied to and utilized for the anode layer A as the fuel gas for power generation.

Figure 19:
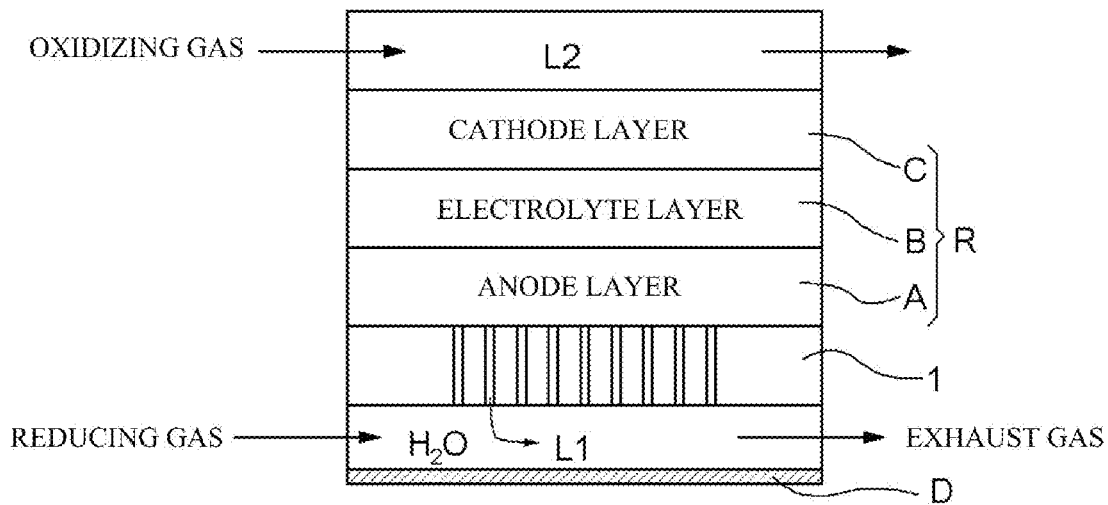
FIGS. 19(a)-19(c) are comparative explanatory views showing a disposition configuration of an internal reforming catalyst layer in the fuel cell single unit.
Figure 19:
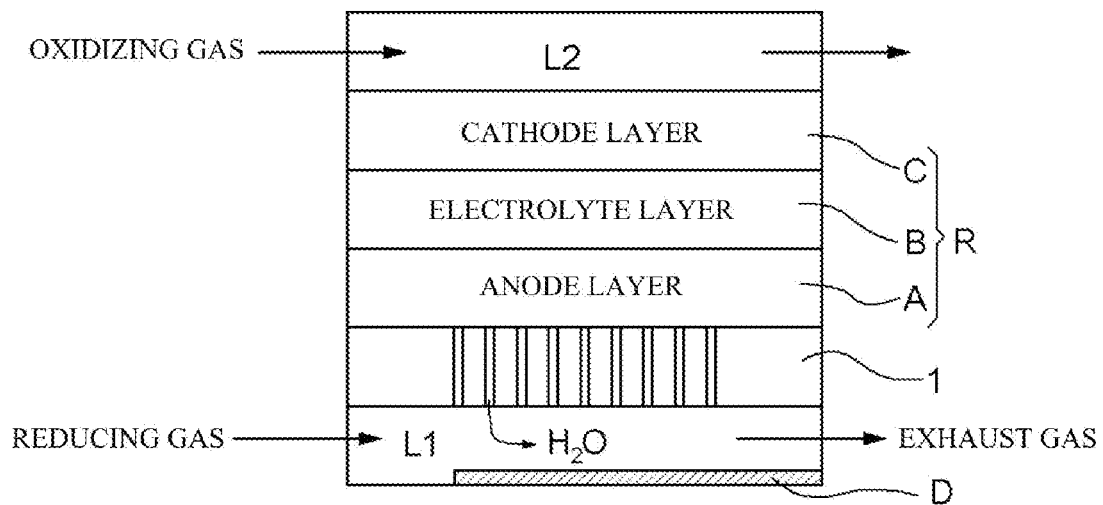
Figure 19:
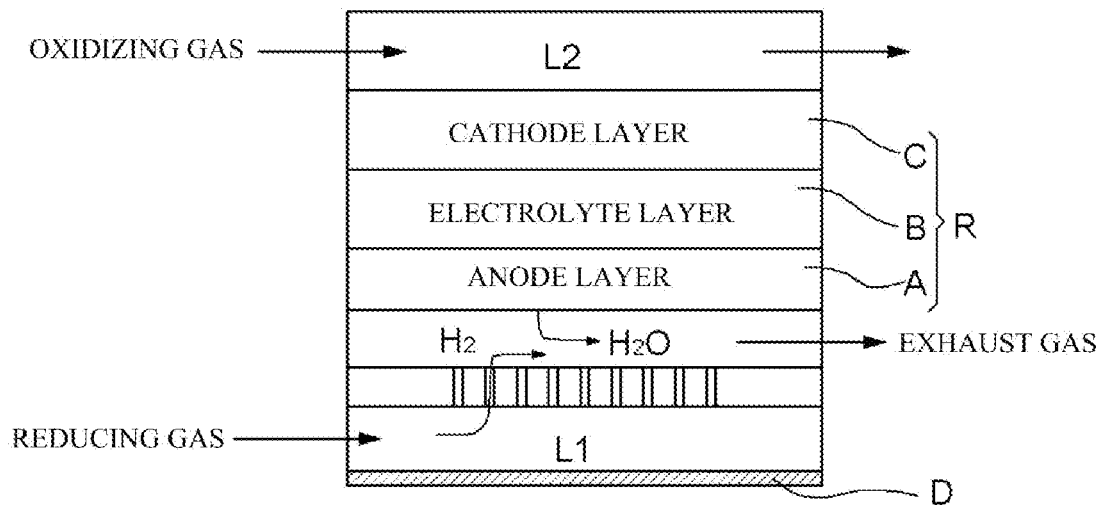

The fuel cell single unit according to the second embodiment practically has a structure shown in FIG. 19(a).

Third Embodiment

Hereinafter, a fuel cell device Y, a fuel cell module M, and a fuel cell single unit U according to the third embodiment will be described with reference to the drawings.

<Fuel Cell Device>

Figure 12:
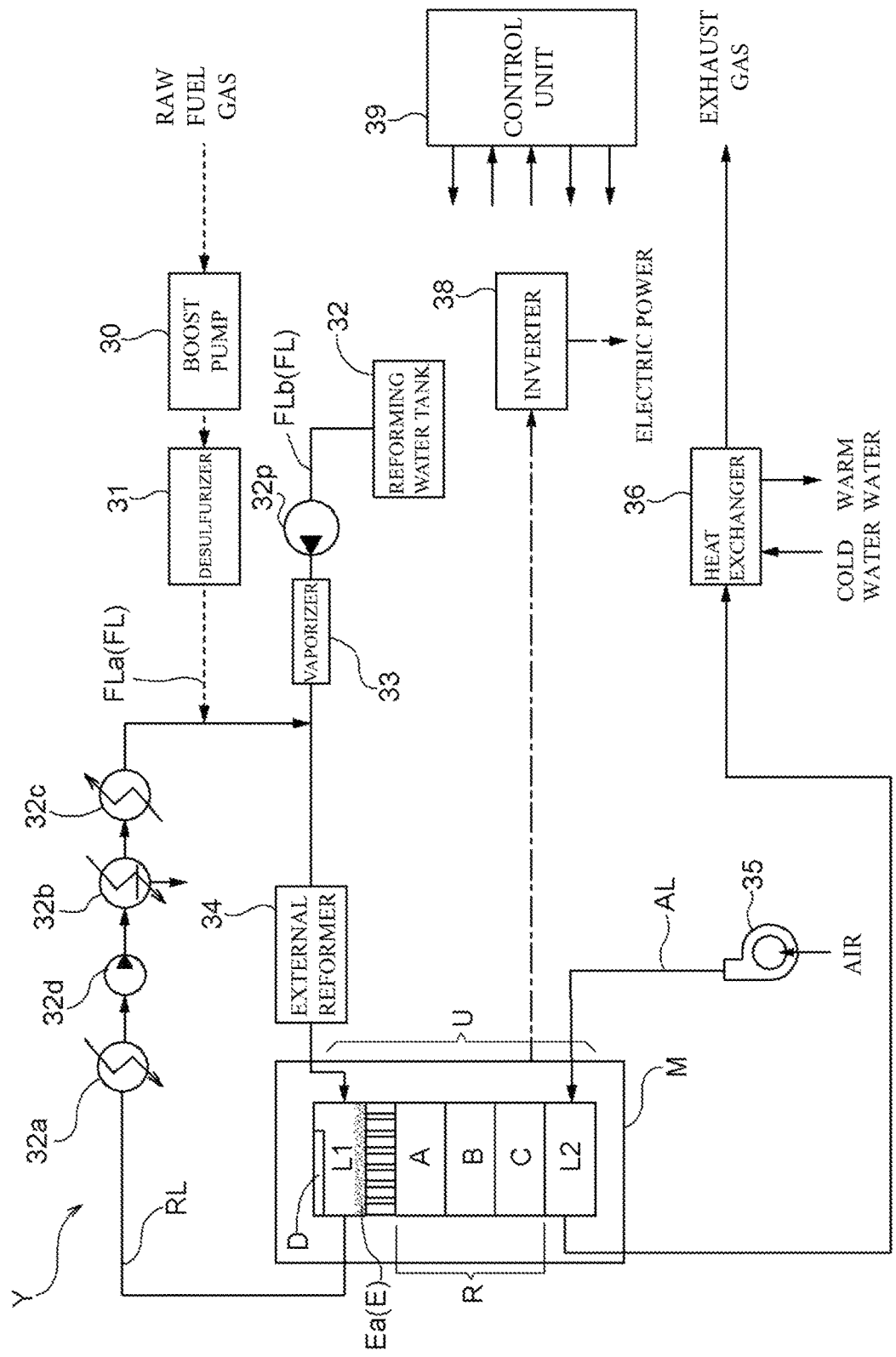
FIG. 12 is a diagram showing a schematic configuration of a fuel cell device according to a third embodiment.

FIG. 12 is a schematic diagram showing the entire configuration of the fuel cell device Y, and shows a fuel gas supply system FL, an oxidizing gas supply system AL, and an anode off-gas circulation system RL which are connected to the fuel cell module M, which is a fuel cell main body.

In the fuel cell module M, one of a plurality of the fuel cell single units U which are stacked to configure the fuel cell module M is schematically shown. As also described above, the fuel cell single unit U includes the fuel cell element R. The fuel cell single unit U, the fuel cell element R, and the like will be described in relation to the first embodiment described above. In the first embodiment, the metal support 1 is formed in a disc shape, whereas in the third embodiment, a metal support 1 is formed in a basic square shape, and in a longitudinal direction thereof, the fuel cell element R, a reducing gas supply path L1, and an oxidizing gas supply path L2 are formed.

Features of the third embodiment are the following two points.
1. In a steady operation state where activation of the fuel cell is completed and power generation is performed according to an electric power load, steam circulated through the anode off-gas circulation system RL is used for reforming.
2. An internal reforming catalyst layer D and a turbulence promotion component E are provided in the reducing gas supply path L1 provided in the fuel cell single unit U.

Also in this embodiment, the fuel cell device Y is configured as a cogeneration system (heat and electric power supply system), and includes a heat exchanger 36 as an exhaust heat utilization unit which utilizes heat discharged from the fuel cell device Y, and an inverter 38 as an output conversion unit for outputting electric power generated in the fuel cell device Y.

A control unit 39 controls operations of the entire fuel cell device Y according to the electric power load required for the fuel cell device Y. Each machine to be controlled will be described in the description of the machine. Input information to the control unit 39 is information on activation start and activation stop of the fuel cell device Y and the electric power load required for the device Y.

The fuel cell device Y is configured to include the fuel cell module M, the fuel gas supply system FL, the oxidizing gas supply system AL, and the anode off-gas circulation system RL. The fuel gas supply system FL corresponds to the fuel supply path of the present invention.

The fuel gas supply system FL includes a raw fuel gas supply system FLa which is provided with a boost pump 30 and a desulfurizer 31, and a steam supply system FLb which is provided with a reforming water tank 32, a reforming water pump 32p, and a vaporizer 33.

The raw fuel gas supply system FLa and the steam supply system FLb adopt a form of being merged into the anode off-gas circulation system RL, and supply a raw fuel gas and steam to an external reformer 34 provided on a downstream side. The external reformer 34 is connected, on a downstream side, to the reducing gas supply path L1 formed in the fuel cell single unit U configuring the fuel cell module M.

The boost pump 30 boosts a hydrocarbon-based gas, such as a city gas, which is an example of the raw fuel gas, and supplies the gas to the fuel cell device Y. In the supply form, an amount of the raw fuel gas commensurate with the electric power load required for the fuel cell device Y is supplied in accordance with an instruction from the control unit 39.

The desulfurizer 31 removes (desulfurizes) a sulfur compound component contained in a city gas or the like.

The reforming water tank 32 stores reforming water (basically pure water) in order to supply steam required for steam reforming in the external reformer 34. In the supply form, the fuel gas is supplied in an amount in accordance with an instruction from the control unit 39 in order to obtain the fuel gas commensurate with the electric power load required for the fuel cell device Y. However, as also will be described later, in the fuel cell device Y according to this embodiment, in the normal steady operation state, steam contained in the anode off-gas can cover the steam required for steam reforming, and thus supply of reforming water from the reforming water tank 32 and vaporization in the vaporizer 33 are fulfilled mainly at the time of activation of the fuel cell device Y.

The vaporizer 33 converts the reforming water supplied from the reforming water tank 32 into steam. The external reformer 34 steam-reforms a raw fuel gas desulfurized in the desulfurizer 31 using the steam produced in the vaporizer 33 to form a reformed gas which is a gas containing hydrogen. However, since the internal reforming catalyst layer D is included in the fuel cell single unit U according to the present invention, reforming of the raw fuel gas is performed also in the unit U. As a result, in the external reformer 34, a part of the raw fuel gas is reformed, and the remainder is supplied, as it is, to the reducing gas supply path L1 of the fuel cell single unit U.

A steam reforming catalyst is stored in the external reformer 34, but examples of this type of catalyst include a ruthenium-based catalyst and a nickel-based catalyst. Moreover, specifically, a $Ru/Al_2O_3$ catalyst obtained by supporting a ruthenium component on an alumina support, a $Ni/Al_2O_3$ catalyst obtained by supporting a nickel component on an alumina support, or the like can be used.

Incidentally, an operation in the steady operation state where the fuel cell device Y continuously generates power according to the electric power load will be described below.

Since the fuel cell is of an oxide ion conduction type, steam is contained in an exhaust gas (an anode off-gas) discharged from the reducing gas supply path L1 provided in the fuel cell single unit U. Therefore, an operation form in which excessive moisture is condensed and removed while cooling the gas, and the anode off-gas whose steam partial pressure is adjusted is returned to the external reformer 34 and provided for steam reforming is adopted.

That is, the fuel cell device Y includes the anode off-gas circulation system RL, and the anode off-gas circulation system RL includes a cooler 32a for cooling the anode off-gas flowing inside, a condenser 32b for further cooling the gas and extracting the condensed water to adjust a steam partial pressure of the anode off-gas flowing inside, and a heater 32c for raising a temperature of the anode off-gas returned to the external reformer 34.

By adopting this structure, a circulation pump 32d is caused to work, and the amount of the steam input to the external reformer 34 may depend on the gas circulated through the anode off-gas circulation system RL. By adjusting a condensation temperature in the condenser 32b at a final stage, the partial pressure of the steam circulated through the anode off-gas circulation system RL can be adjusted, and a steam/carbon ratio (a S/C ratio) of the gas input to the external reformer 34 can be controlled.

In the circulation form, an amount of steam required when at least a part of the raw fuel gas is reformed in the external reformer 34 in accordance with the electric power load required for the fuel cell device Y is set so that an appropriate S/C ratio is obtained in the external reformer 34, and the operation is performed in accordance with an instruction from the control unit 39.

Objects to be controlled here are a circulation amount by the circulation pump 32d, pressure setting, and setting and controlling of a condensation temperature (as a result, a steam partial pressure at an outlet) in the condenser 32b which is a final stage of cooling.

The oxidizing gas supply system AL is provided with a blower 35, and, on a downstream side, connected to the oxidizing gas supply path L2 formed in the fuel cell single unit U configuring the fuel cell module M. An air suction amount by the blower 35 also ensures an air amount sufficient to cause a power generation reaction in the fuel cell in accordance with the electric power load, and the operation is performed in accordance with an instruction from the control unit 39.

The above description is a contrivance mainly of the supply side of the reducing gas in the third embodiment, but as in the present invention, in a configuration in which the internal reforming catalyst layer D is included in the fuel cell single unit U and hydrogen or carbon monoxide obtained by internal reforming is used as a cell fuel, steam produced by power generation is consumed by steam reforming, and thus a load on the condenser 32b to be provided for condensing steam contained in the anode off-gas described above is reduced. As a result, the fuel cell device Y according to the present invention is also advantageous in this respect.

Contrivance of Position where Internal Reforming Catalyst Layer is Provided

Figure 13:
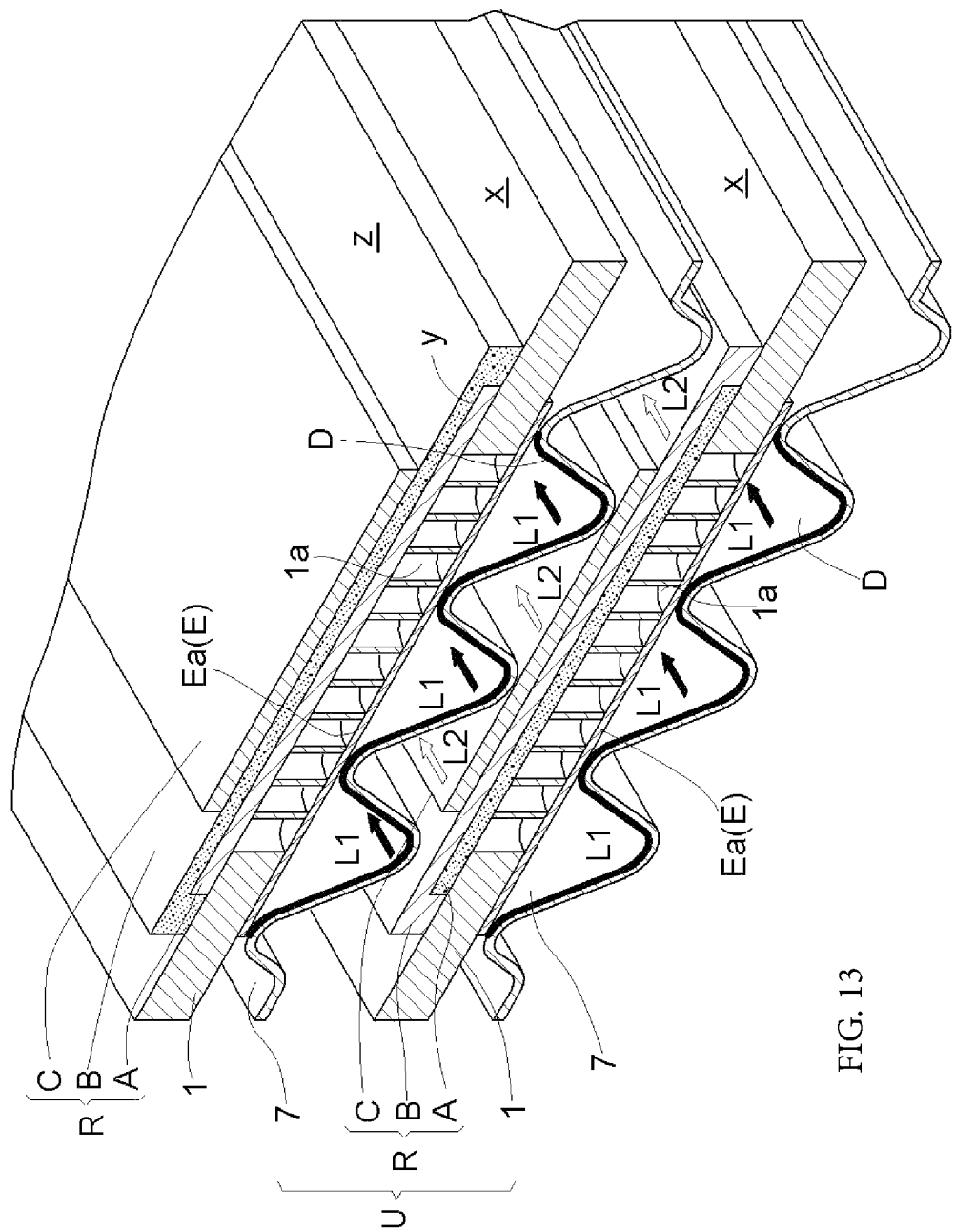
FIG. 13 is a perspective cross-sectional view of a main part of a fuel cell module including a pair of fuel cell single units in the third embodiment.
Figure 14:
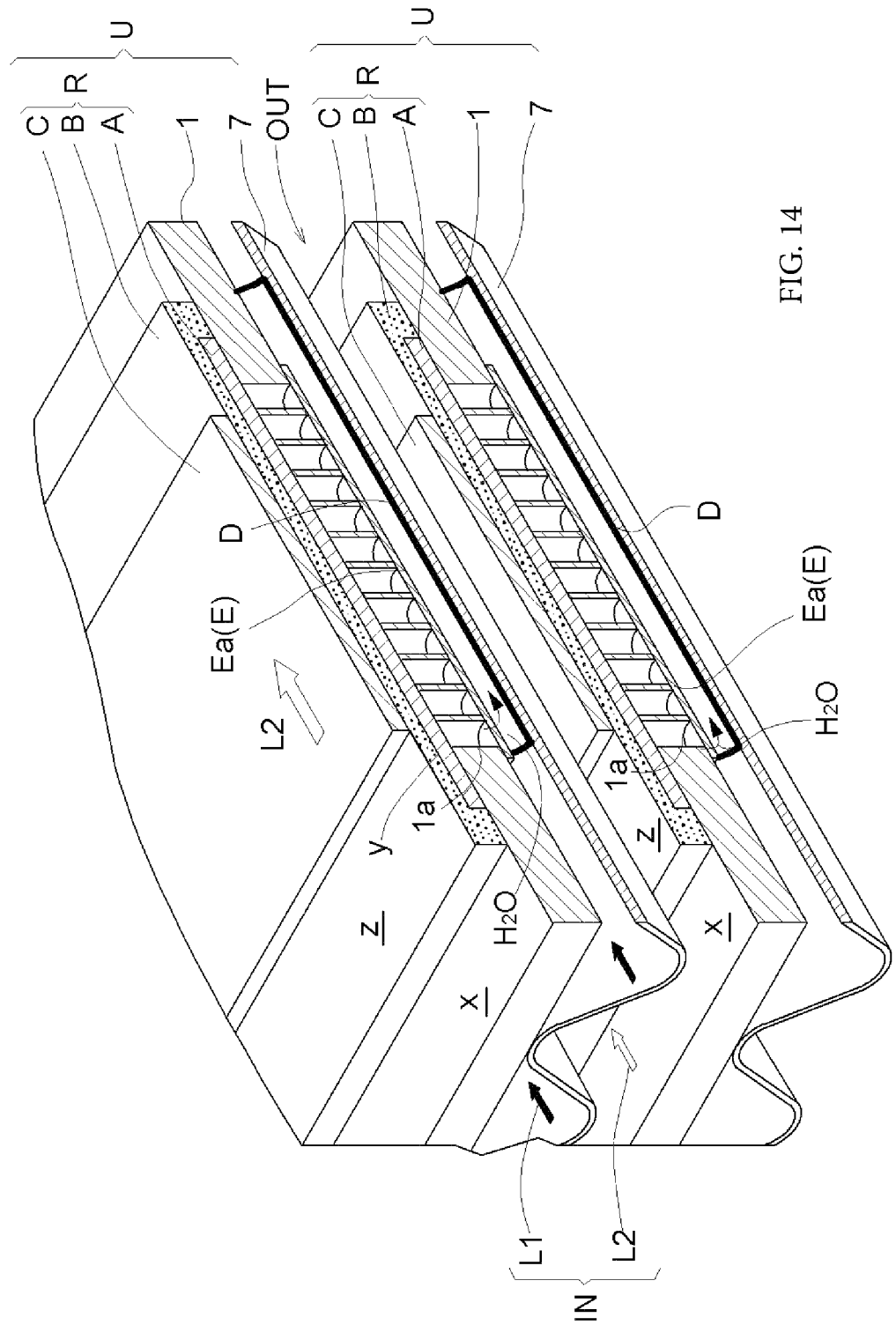
FIG. 14 is another perspective cross-sectional view of the main part of the fuel cell module including the pair of fuel cell single units in the third embodiment.

As shown in FIGS. 13 and 14, the fuel cell single unit U according to the third embodiment is formed in a substantially square box shape when viewed from above, and flow directions of the reducing gas and the oxidizing gas are set to a specific one direction. In FIGS. 13 and 14, the direction is upward to the right in the drawings.

Incidentally, the position where the internal reforming catalyst layer D is provided is as described above, but in this embodiment, as shown in FIG. 14, the position of the internal reforming catalyst layer D is limited to a position which is the same as that of a through-hole 1a on the most upstream side in the flow direction of the reducing gas, among through-holes 1a provided to supply the reducing gas to an anode layer A and discharge steam generated in the anode layer A to the reducing gas supply path L1, and a position on a downstream side of the position.

By providing the internal reforming catalyst layer D at such a position, the steam generated in the anode layer A can be effectively used according to the object of the present invention.

The fuel cell single unit U according to the third embodiment practically has a structure shown in FIG. 19(b).

Contrivance to Provide Turbulence Promotion Component

As shown in FIGS. 12, 13, and 14, the reducing gas supply path L1 for supplying the fuel gas to the anode layer A is provided with the turbulence promotion component E (Ea) for disturbing the flow in the path.

More specifically, a net-like body Ea is provided on a surface of the through-hole 1a, which is formed so as to penetrate the metal support 1, on an inflow side of the reducing gas, which is a gas containing hydrogen, and opposite to a surface on which the fuel cell element R is formed. Specifically, the net-like body Ea is formed by sticking a lath metal or a metal wire mesh on the metal support 1. As a result, the gas containing hydrogen flowing through the reducing gas supply path L1 is disturbed by the net-like body Ea, and induces a flow direction component toward the through-hole 1a and flow flowing out from the through-hole 1a, and thus the supply of the fuel gas to the anode layer A and the leading of the steam from the anode layer A can be favorably caused.

The above description relates to the structure of the fuel cell in which the internal reforming (the steam reforming in the fuel cell element R) is performed by utilizing the steam $H_2O$ produced in the anode layer A of the fuel cell element R in the fuel cell single unit U according to the present invention.

Advantages in a case where the fuel cell is operated with the internal reforming of the present invention will be described below.

Figure 15:
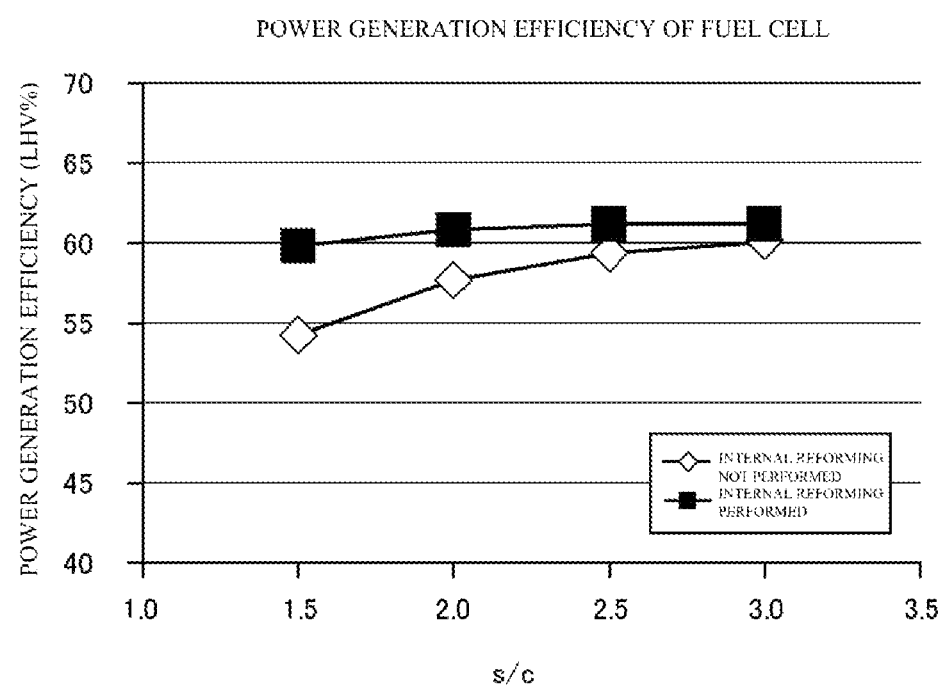
FIG. 15 is a graph showing a comparison of power generation efficiency of a fuel cell in a case of performing internal reforming in the fuel cell single unit with power generation efficiency of a fuel cell in a case of not performing the internal reforming.
Figure 16:
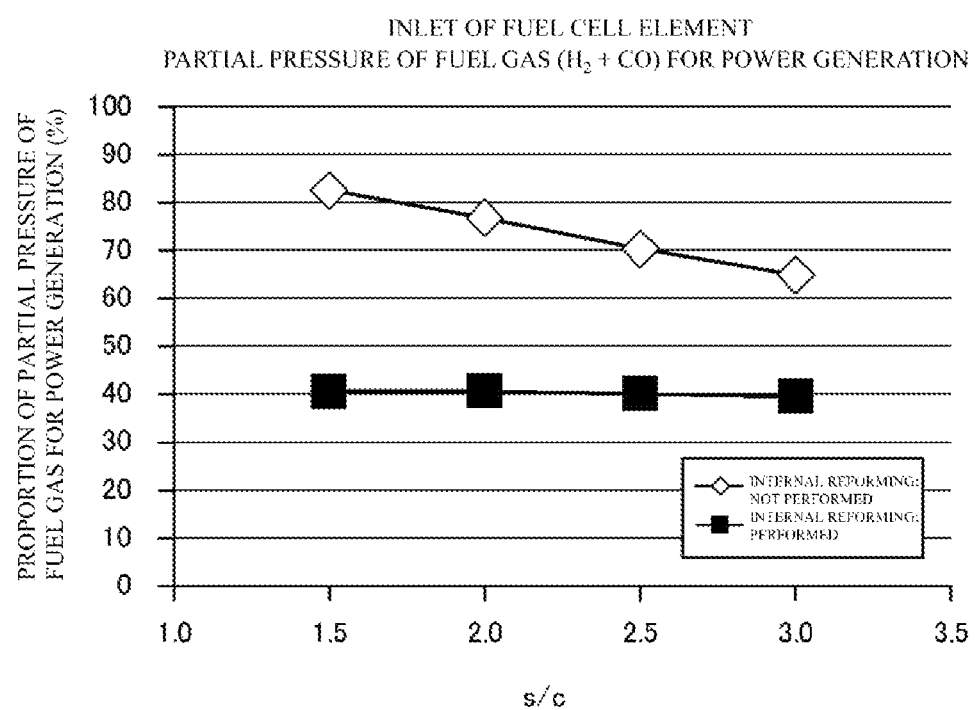
FIG. 16 is a graph showing a partial pressure of a fuel gas for power generation at an inlet of a fuel cell element in each of a case of performing internal reforming in the fuel cell single unit and a case of not performing the internal reforming.
Figure 17:
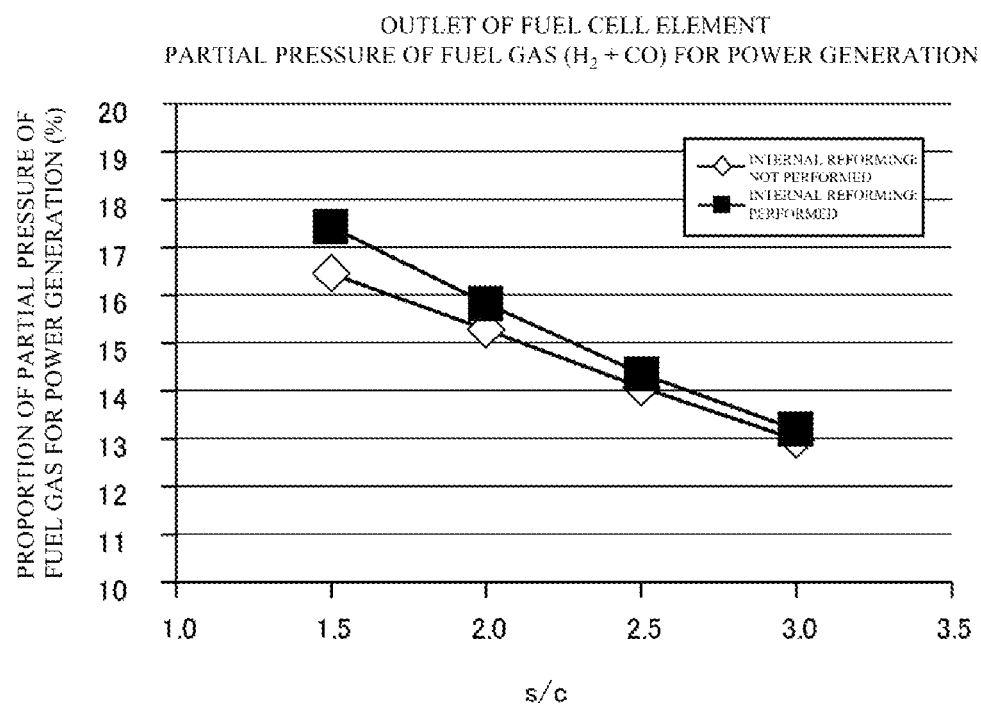
FIG. 17 is a graph showing a partial pressure of a fuel gas for power generation at an outlet of the fuel cell element in each of the case of performing internal reforming in the fuel cell single unit and the case of not performing the internal reforming.
Figure 18:
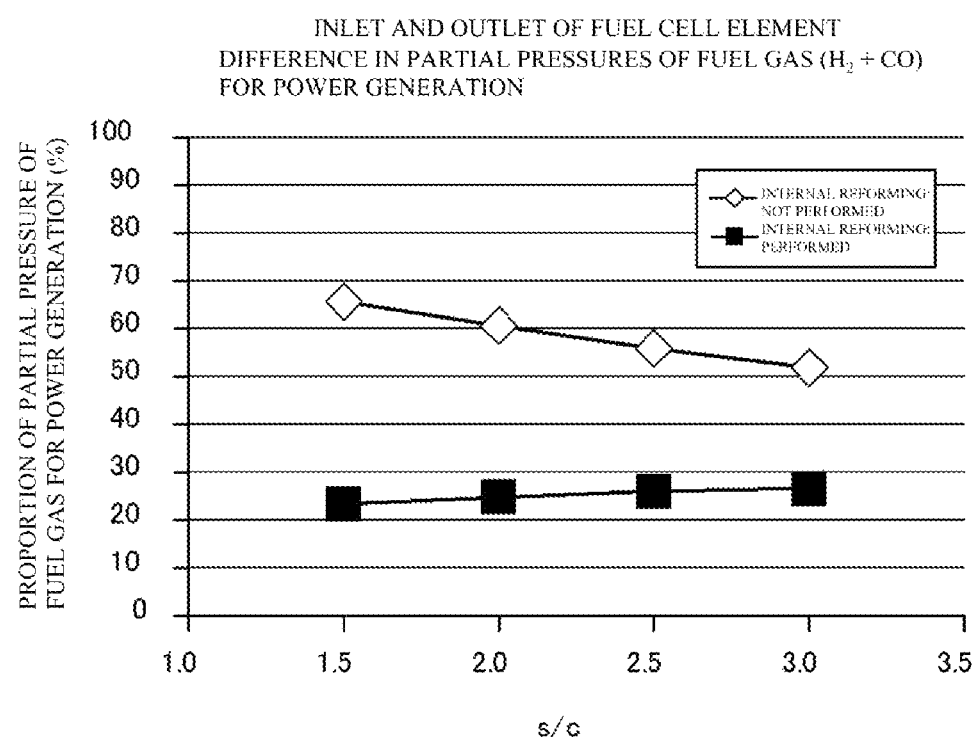
FIG. 18 is a graph showing a difference in the partial pressures of the fuel gases for power generation between the inlet and the outlet of the fuel cell element in each of the case of performing internal reforming in the fuel cell single unit and the case of not performing the internal reforming.

FIG. 15 shows a comparison of the power generation efficiency of the fuel cell between a case where internal reforming is performed and a case where the internal reforming is not performed, and FIGS. 16 and 17 show partial pressures of fuel gas for power generation, which contains hydrogen and carbon monoxide, at the inlet and the outlet (specifically, the inlet and the outlet of the reducing gas supply path L1) of the fuel cell element R in both the cases. FIG. 18 is a graph showing a difference in the partial pressures of the fuel gas for power generation between the same inlet and the same outlet.

Regarding the description of the partial pressure of the fuel gas for power generation, a proportion (%) with respect to a total gas pressure is used.

Furthermore, the difference in the partial pressures of the fuel gas for power generation is as follows.

Proportion of partial pressure of fuel gas for power generation at inlet of reducing gas supply path: Rin $R\text{in}=[\text{partial pressure of fuel gas for power generation}]/[\text{total gas pressure}] \times 100\%$ Proportion of partial pressure of fuel gas for power generation at outlet of reducing gas supply path: Rout $R\text{out}=[\text{partial pressure of fuel gas for power generation}]/[\text{total gas pressure}] \times 100\%$ Difference in partial pressures of fuel gas for power generation=$R\text{in}-R\text{out}[\%]$ In these drawings, a black square mark indicates a case where the internal reforming according to the present invention is performed, and a white rhombus mark corresponds to a case where the internal reforming is not performed.

In all the drawings, a horizontal axis represents a molar ratio (a S/C ratio) of steam (S) and carbon (C) introduced into the fuel cell. The S/C ratio is a S/C ratio of the gas (the mixed gas of the raw fuel gas and the steam) introduced into the external reformer 34 in the configurations of the fuel cell devices Y shown in FIGS. 1, 7, and 12, and is an operating parameter which may be changed depending on operating conditions such as the electric power load of the fuel cell. The S/C ratio was changed from 1.5 to 3.0 at an interval of 0.5. The range is a range which may be normally changed in the operation of the fuel cell device Y.

In addition, conditions set for the investigation are shown.
Generated voltage of fuel cell single unit 0.8 V
Temperature (=internal reforming temperature) of fuel cell element 700° C.
Total fuel utilization rate of fuel cell 80%
The total fuel utilization rate of the fuel cell is a proportion of the fuel gas ($H_2$+CO) for power generation consumed by the power generation reaction in the fuel cell device Y, and is expressed by the following expression.

[Number of moles of fuel gas for power generation consumed by power generation reaction]/[total of fuel gases for power generation which are supplied to fuel cell and produced by internal reforming]×100%

Reducing gas hydrogen and carbon monoxide
Electrolyte oxygen ion conduction-type electrolyte
Equilibrium temperature of external reformer
  case where internal reforming is performed 700° C.
  case where internal reforming is not performed 500° C.
Process pressure 120 kPa
The process pressure is specifically a gas pressure in the external reformer 34 and the respective gas supply paths L1 and L2.

Investigation Results
<Power Generation Efficiency or the Like>

As is also clear from FIG. 15, in a case where the internal reforming is performed, the fuel gas for power generation is increased due to fuel reforming by the steam generated inside the fuel cell, the power generation amount is increased under conditions of a constant fuel utilization rate, and thus efficiency is increased.

Since the equilibrium temperature of the external reformer 34 in a case where the internal reforming is performed can be suppressed as low as 500° C., even when the S/C ratio is low, thermal decomposition (caulking) of hydrocarbon is less likely to occur, and thus an advantage of enhancing reliability of a process or a system arises.

As a result, due to the design of the fuel cell device Y, lowering the temperature of the external reformer 34 and reducing the S/C ratio can supply steam reforming reaction heat and evaporation heat and reduce a heat transfer area of the condenser (the condenser 32*b* which is included in the anode off-gas circulation system RL described in the third embodiment) for water self-sustaining (an operation form in which a fuel gas is obtained by performing steam reforming using only steam (water) produced by power generation in an operation state where power generation is performed according to the electric power load), which is also advantageous in terms of a cost. In this investigation, when the S/C ratio in a case where the internal reforming is not performed is set to 2.5, and the S/C ratio in a case where the internal reforming is performed is set to 2.0, due to the design of the fuel cell device Y, a quantity of heat required for the external reformer 34 is reduced by 60%, a quantity of heat transfer of the vaporizer 33 required for steam generation is reduced by 20%, and direct-current power generation efficiency is improved by 3.6%.

<Partial Pressure of Fuel Gas for Power Generation>

As is also clear from FIG. 16, there is a difference of about 1.5 to 2 times in the partial pressures of the fuel gas for power generation at the inlet of the fuel cell element R depending on the presence or absence of the internal reforming, and a value in a case where the internal reforming is performed is a lower value. In a case where the internal reforming is not performed, the higher the S/C ratio, the lower the partial pressure. This is because an influence of an increase in the steam is greater than an influence of an increase in the production amount of the hydrogen or the carbon monoxide.

In a case where the internal reforming is performed, even when the S/C ratio is changed, the partial pressure of the fuel gas for power generation is hardly changed. Since the temperature of the external reformer 34 is low, an increase in the fuel and an increase in the steam due to the high S/C ratio are almost balanced.

In addition, in a case where the internal reforming is performed, the partial pressure of the fuel gas for power generation at the inlet of the fuel cell can be reduced by lowering the temperature (500° C.) of the external reformer 34, but the steam reforming reaction rapidly occurs due to the generated steam in the fuel cell (700° C.), and thus the partial pressure of the fuel gas for power generation at the outlet of the fuel cell is increased. The increase in the partial pressure at the outlet of the cell is advantageous for stabilizing off-gas combustion.

Furthermore, in a case where the internal reforming is performed, by reducing the difference (concentration difference) in the partial pressures of the fuel gas for power generation between the outlet and the inlet of the fuel cell, uneven distribution of power generation amounts in the fuel cell element R is reduced, a temperature difference is also reduced, and thus durability or reliability is improved by relaxing thermal stress of the fuel cell.

<Operation of Fuel Cell Device Y>

According to the investigation conducted by the inventors as described above, the fuel cell device described above is preferably operated under the following conditions.

(1) The steam/carbon ratio (the S/C ratio) at the inlet of the external reformer 34 is controlled to be within a range of 1.5 to 3.0. The S/C ratio is more preferably controlled to be within a range of 1.5 to 2.5. In particular, when the external reformer 34 is operated at a relatively low S/C ratio (1.5 to 2.5) as described above, by reducing the concentration of the sulfur contained in the raw fuel gas to 1 vol. ppb or less (more preferably, 0.1 vol. ppb or less), adverse effects such as poisoning of the reforming catalyst or the like by a sulfur content contained in the raw fuel gas can be greatly reduced, the reliability and durability of the fuel cell device can be improved, and a stable operation can be continued.

(2) The reforming temperature in the external reformer 34 is controlled to be lower than the temperature in the internal reforming catalyst layer D provided in the reducing gas supply path L1.

(3) The operation is performed so that the partial pressure of the fuel gas for power generation at the inlet of the reducing gas supply path L1 is 50% or less of a total gas pressure.

That is, under the same electric power load, the partial pressure of the fuel gas for power generation at the inlet of the reducing gas supply path L1 is controlled to be lower than the partial pressure of the fuel gas for power generation at the inlet of the reducing gas supply path L1, which is set when the reforming of the fuel gas is mainly performed in the external reformer 34 (for example, at the time of starting the fuel cell device Y).

(4) The operation is performed so that the difference between the proportions (the proportion of the partial pressure of the fuel gas for power generation with respect to the total gas pressure, which is expressed in a percentage) of the partial pressures of the fuel gas for power generation at the inlet and the outlet of the reducing gas supply path L1 is maintained within 40%.
(5) The reforming conversion rate of the fuel gas reformed by the external reformer 34 is set to 30% to 60%.
(6) Under the same electric power load, the steam/carbon ratio (the S/C ratio) at the inlet of the external reformer 34 is controlled to be lower than the steam/carbon ratio (the S/C ratio) set when the reforming of the fuel gas is mainly performed in the external reformer 34 (for example, at the time of starting the fuel cell device Y).

Other Embodiments (1) In the first embodiment and the second embodiment, the example in which the internal reforming catalyst layer D is provided over the entire flow direction of the gas flowing through the reducing gas supply path L1 provided in the fuel cell single unit has been shown, but in these embodiments as well, as shown in FIG. 19(b) according to the third embodiment, the internal reforming catalyst layer D can be provided on the downstream side of the steam supply path (the through-hole 1a) provided on the most upstream side. With this configuration, the amount of the internal reforming catalyst can be reduced to reduce a cost.
(2) In the first embodiment, the anode layer A is disposed between the metal support 1 and the electrolyte layer B, and the cathode layer C is disposed on a side opposite to the metal support 1 when viewed from the electrolyte layer B. A configuration in which the anode layer A and the cathode layer C are disposed in reverse can also be adopted. That is, a configuration in which the cathode layer C is disposed between the metal support 1 and the electrolyte layer B, and the anode layer A is disposed on a side opposite to the metal support 1 when viewed from the electrolyte layer B can also be adopted. In this case, by reversing the positional relationship between the reducing gas supply path L1 and the oxidizing gas supply path L2, and, as also described above, providing the internal reforming catalyst layer D on the side (in this case, the lower side of the metal separator 7) of the reducing gas supply path L1, the object of the present invention can be achieved.
(3) In each of the above-described embodiments, one fuel cell element R is formed on the metal support 1, but a plurality of the fuel cell elements R may be divided and arranged on the front side of the metal support 1.
(4) In the embodiments described above, regarding the formation site of the internal reforming catalyst layer D, a case where the internal reforming catalyst layer D is formed on the rear side 1f of the metal support 1 and the inner surface of the metal separator 3 or 7 on the side of the reducing gas supply path L1 has been described, but when the internal reforming catalyst layer D is formed at a site where the steam produced in the anode layer A flows, the internal reforming catalyst layer D serves for the internal reforming, and thus may be provided on the inner surface of the through-hole 1a provided in the metal support 1.
(5) Regarding the reforming in the external reformer 34, the external reformer 34 performs the steam reforming, but in the present invention, the load on the external reformer 34 can be reduced, and thus a reformer which performs reforming other than the steam reforming, for example, partial combustion reforming or autothermal reforming can also be adopted.

The raw fuel gas used in the present invention is a so-called hydrocarbon-based fuel, which may be any fuel as long as at least hydrogen can be produced by reforming the raw fuel gas.

Figure 20:
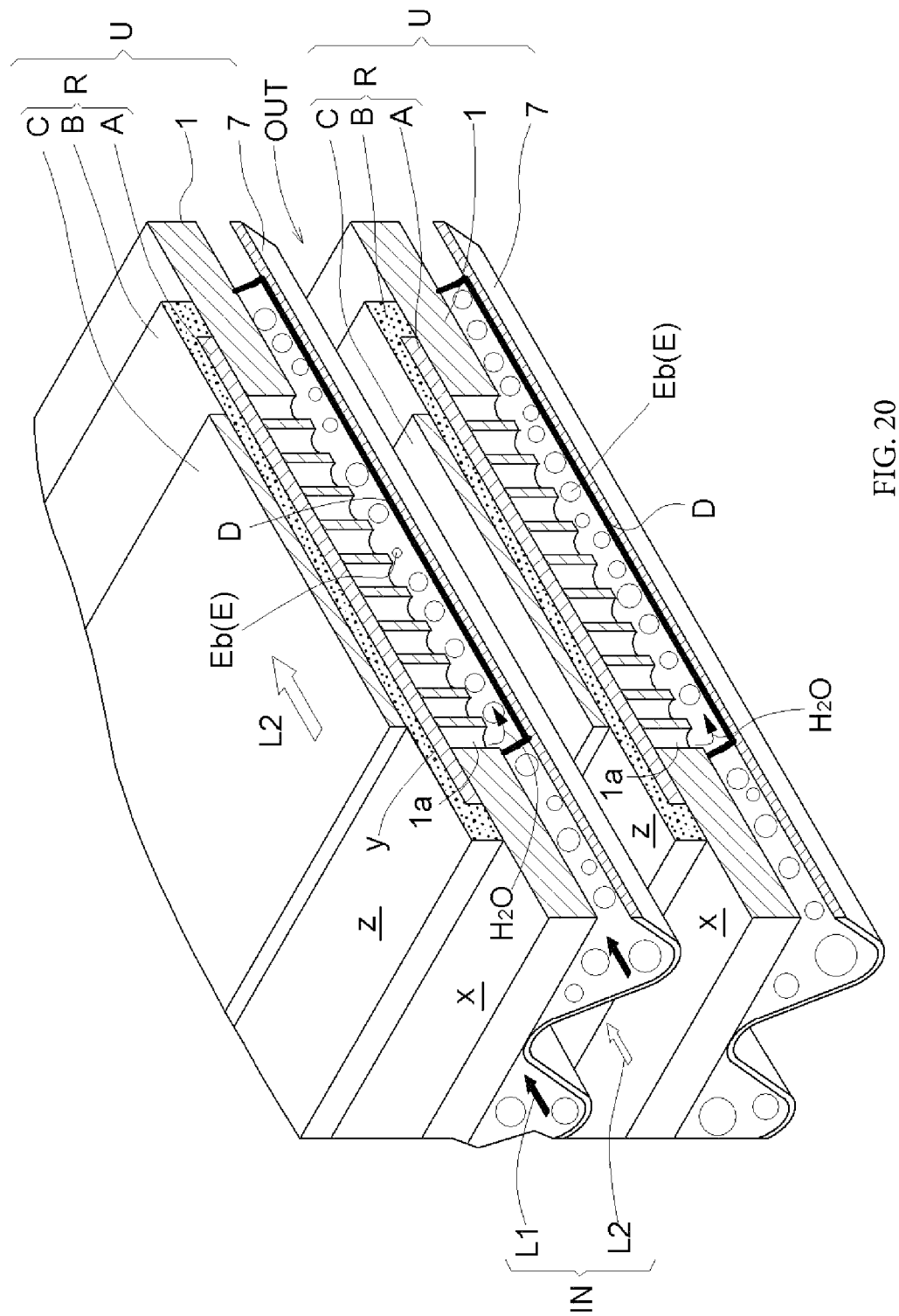
FIG. 20 is a view showing another embodiment of a turbulence promotion component.
Figure 21:
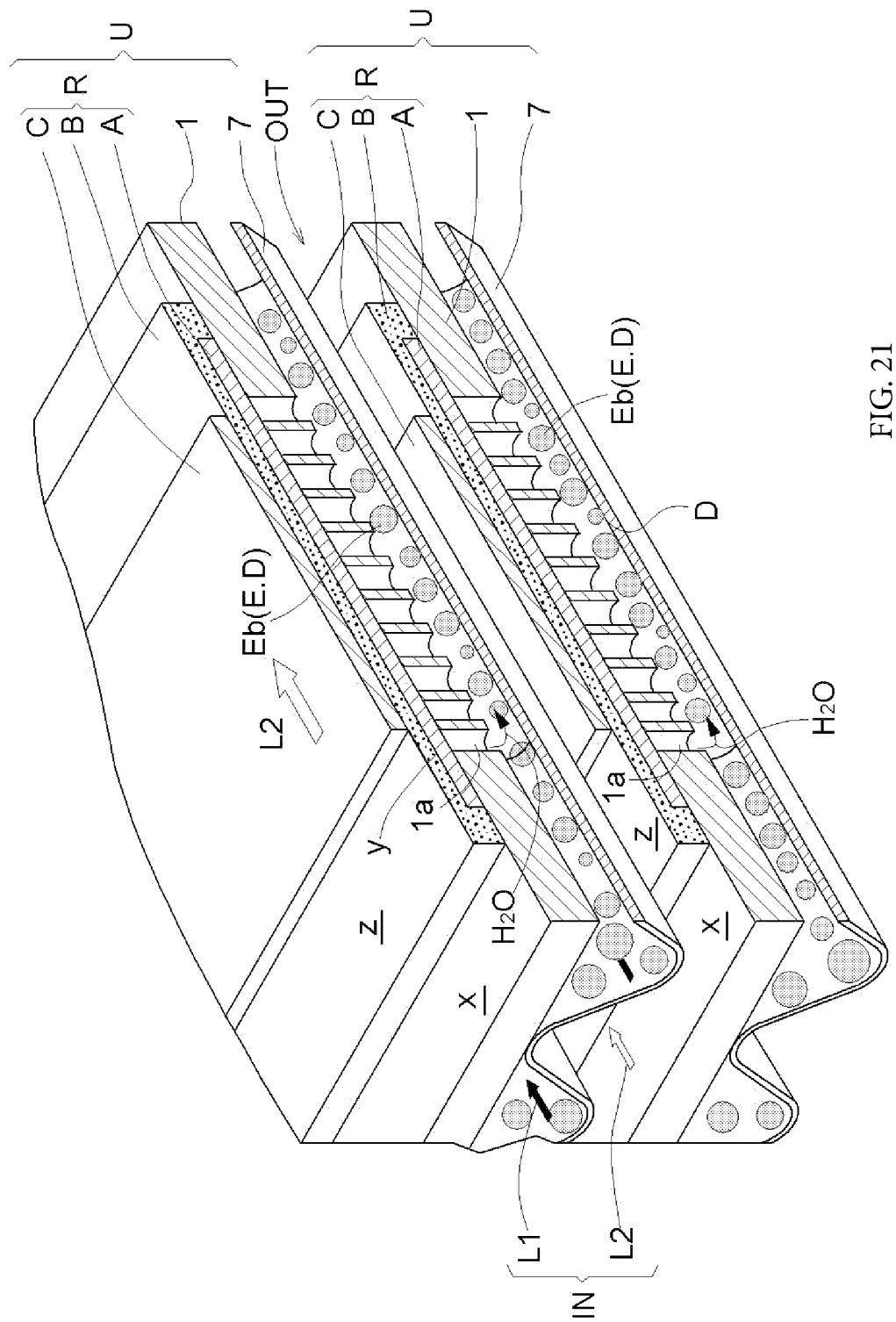
FIG. 21 is a view showing another embodiment in which the internal reforming catalyst layer is provided on a surface of the turbulence promotion component.

(6) In the above embodiments, the turbulence promotion component E is formed with the net-like body Ea and is stuck on the surface of the metal support 1, but the turbulence promotion component E may have a function of directing the flow in the reducing gas supply path L1 in the direction of the through-hole 1a, and a large number of obstacle bodies Eb which disturb the flow of the reducing gas supply path L1 may be arranged. The obstacle body Eb may have any shape such as a spherical shape, a triangular pyramid shape, and a columnar shape. FIG. 20 shows an example in which the obstacle body Eb has a spherical shape.
(7) In the above embodiment, the internal reforming catalyst layer D and the turbulence promotion component E are described as being independent from each other, but for example, the internal reforming catalyst layer D may be provided on at least a part of the surface of the net-like body Ea described above or at least a part of the obstacle body Eb. This example is shown in FIG. 21.

That is, by providing the internal reforming catalyst layer D on at least a part (in the illustrated example, a surface) of the turbulence promotion component E, the turbulence promotion component E can be disposed to exhibit both functions of turbulent flow promotion and internal reforming.

Figure 22:
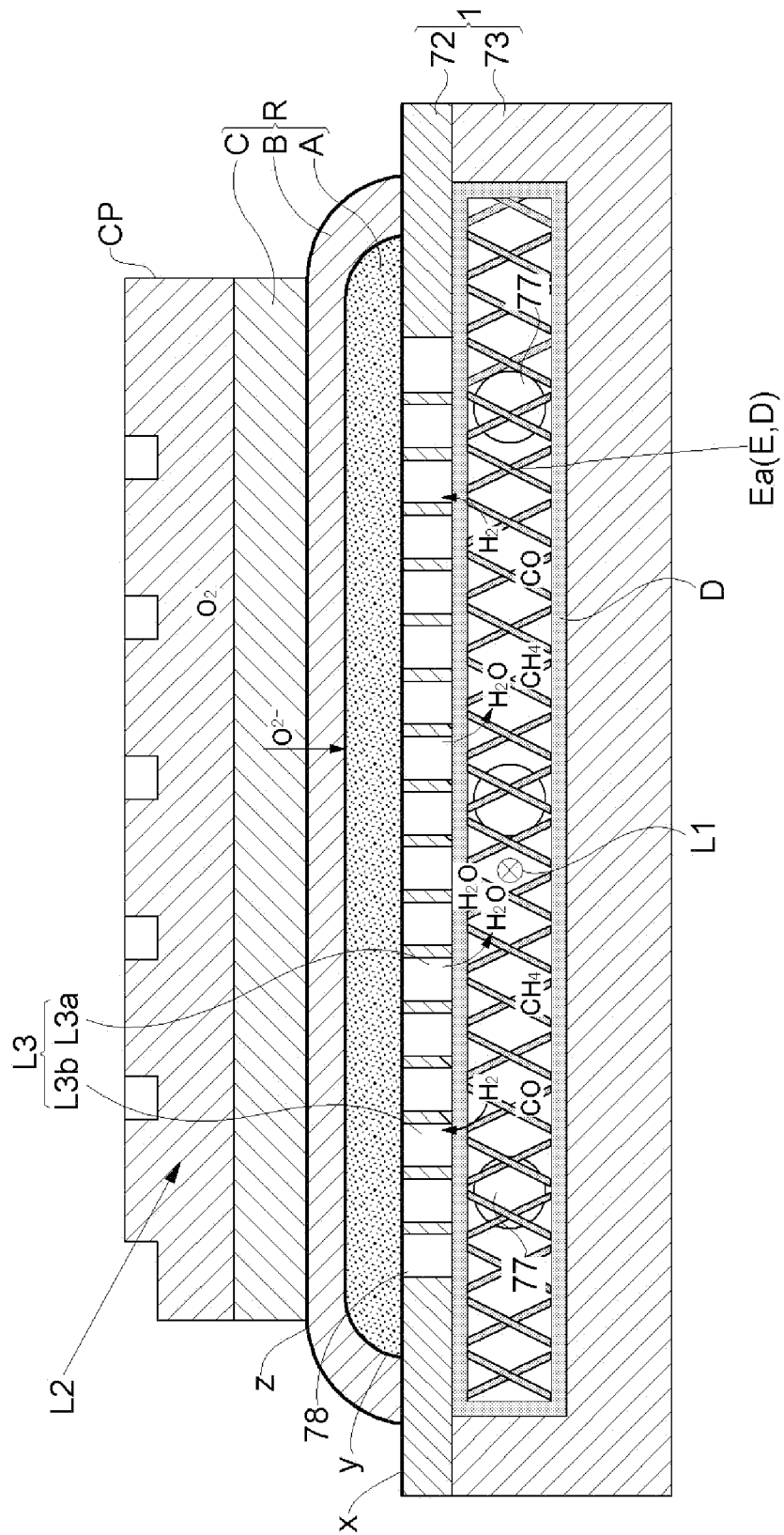
FIG. 22 is a cross-sectional view of the fuel cell single unit according to the second embodiment, which includes the turbulence promotion component.

(8) In the first embodiment and the second embodiment, the example in which the internal reforming catalyst layer D is provided in the reducing gas supply path L1 has been shown. Also in these embodiments, the turbulence promotion component E may be provided in the reducing gas supply path L1. FIG. 22 shows a configuration example in a case of the second embodiment of the present invention. In this example, the mesh as the net-like body Ea (E) serving as the turbulence promotion component is disposed inside the reducing supply path L1 formed in the tube, and the internal reforming catalyst layer D is also formed on the outer surface thereof.
(9) In the above embodiments, the example in which the hydrocarbon-based gas such as a city gas (a gas which contains methane as a main component, and also contains ethane, propane, butane, and the like) is used as the raw fuel gas has been shown, but as the raw fuel gas, hydrocarbons such as a natural gas, naphtha, and kerosene, alcohols such as methanol and ethanol, and ethers such as DME can be used.
(10) In the above embodiment, the case where the external reformer 34 is included in the fuel cell device Y has been described, but since the fuel cell single unit U according to the present invention includes the internal reforming catalyst layer D inside, and the reforming is performed at the site, the raw fuel gas may be supplied, as it is, to the fuel gas supply path provided in the fuel cell single unit U, without providing the external reformer 34, to cause the internal reforming, and the reformed gas may be supplied to the anode layer. That is, it is not necessary for hydrogen (reformed gas) to flow through the entire fuel gas supply path L1 provided in the fuel cell single unit U.

(11) In the above embodiments, the case where the intermediate layer y is provided between the anode layer A and the electrolyte layer B, and the reaction preventing layer z is provided between the electrolyte layer B and the cathode layer C has been described, but a configuration in which interposed layers such as the intermediate layer y and the reaction preventing layer z, which are interposed between the electrode layer and the electrolyte layer, is not provided may be adopted, or only one of the interposed layers may be provided. Moreover, the number of the interposed layers can also be increased, as needed.

(12) In the above embodiments, the case where the metal oxide layer x as a diffusion suppressing layer is provided on the surface of the metal support 1 has been described, but as needed, a configuration in which the metal oxide layer x is not provided may be adopted, or a plurality of the metal oxide layers x may be provided. Moreover, a diffusion suppressing layer different from the metal oxide layer can also be provided.

Furthermore, the configurations disclosed in the above-described embodiments can be applied in combination with the configuration disclosed in another embodiment unless inconsistency occurs, and since the embodiments disclosed in the present specification are examples, the embodiments of the present invention are not limited thereto and can be appropriately modified within a range not departing from the object of the present invention.

The invention claimed is:

1. A metal support-type fuel cell configured as a fuel cell single unit, comprising: a fuel cell element in which an anode layer and a cathode layer are formed with an electrolyte layer interposed therebetween, a reducing gas supply path configured to supply a gas containing hydrogen to the anode layer, and an oxidizing gas supply path configured to supply a gas containing oxygen to the cathode layer, the fuel cell element is formed in a thin layer shape on a metal support formed in a plate shape and made of a gas impermeable material, an internal reforming catalyst layer provided on at least a part of an inner surface of the reducing gas supply path, the internal reforming catalyst layer configured to produce hydrogen from a raw fuel gas by a steam reforming reaction, and an internal reformed fuel supply path configured to discharge steam generated by a power generation reaction from the anode layer to lead the steam to the internal reforming catalyst layer, and to lead hydrogen produced in the internal reforming catalyst layer to the anode layer, wherein a plurality of bored through-holes penetrating from a front side to a rear side of the metal support are provided, the anode layer is provided with a thickness of 1 μm to 100 μm and in direct contact with one surface of the metal support and covers the plurality of bored through-holes, and the reducing gas supply path is provided along another surface of the metal support, wherein at least one metal separator configured to partition the reducing gas supply path and the oxidizing gas supply path is provided, the metal separator having an uneven corrugated section, the fuel cell single unit has a square box shape, the reducing gas supply path is formed between the metal support and the metal separator, wherein a portion of the metal support and the metal separator are in direct contact, the oxidizing gas supply path is formed between the cathode layer and the metal separator of another fuel cell single unit in a stacked construction, a position where the internal reforming catalyst layer is provided is limited to a position which is the same as that of a through-hole on the most upstream side or a position on a downstream side of the through-hole in a flow direction of a reducing gas in the reducing gas supply path, and the internal reformed fuel supply path is formed by the plurality of bored through-holes and the reducing gas supply path communicating with the bored through-holes within the fuel cell single unit serving as a solid oxide fuel cell in-a the flow direction of the reducing gas in the reducing gas supply path.

2. The metal support-type fuel cell according to claim 1, wherein in the metal support, the internal reforming catalyst layer is provided on the inner surface on which the reducing gas supply path is provided, which inner surface is different from a surface on which the fuel cell element is formed.

3. The metal support-type fuel cell according to claim 1, wherein the internal reforming catalyst layer is provided inside the bored through-holes.

4. The metal support-type fuel cell according to claim 1, wherein a reforming catalyst contained in the internal reforming catalyst layer is a catalyst in which a metal is supported on a support.

5. The metal support-type fuel cell according to claim 1, wherein a reforming catalyst contained in the internal reforming catalyst layer is a catalyst containing Ni.

6. The metal support-type fuel cell according to claim 1, wherein the anode layer contains Ni.

7. The metal support-type fuel cell according to claim 1, wherein a reforming catalyst contained in the internal reforming catalyst layer is a catalyst containing Ni, the anode layer contains Ni, and a Ni content in the anode layer is different from a Ni content in the internal reforming catalyst layer.

8. The metal support-type fuel cell according to claim 1, wherein a Ni content in the anode layer is 35% by mass to 85% by mass.

9. The metal support-type fuel cell according to claim 1, wherein a Ni content in the internal reforming catalyst layer is 0.1% by mass to 50% by mass.

10. The metal support-type fuel cell according to claim 1, wherein a turbulence promotion component configured to disturb flow in the reducing gas supply path is provided in the reducing gas supply path.

11. The metal support-type fuel cell according to claim 1, wherein the fuel cell element is a solid oxide fuel cell.

12. A fuel cell module comprising:
a plurality of the metal support-type fuel cells according to claim 11,
wherein the oxidizing gas supply path of one fuel cell single unit is configured to supply the gas containing oxygen to the cathode layer of another fuel cell single unit adjacent to the one fuel cell single unit.

13. A fuel cell device comprising:
at least the fuel cell module according to claim 12 and an external reformer; and
a fuel supply unit configured to supply a fuel gas containing a reducing component to the fuel cell module.

14. A fuel cell device comprising, at least:
the fuel cell module according to claim 12; and
an inverter configured to extract electric power from the fuel cell module.

15. The fuel cell device according claim 13, further comprising:
an exhaust heat utilization unit configured to reutilize heat discharged from the fuel cell module and/or the external reformer.

16. The fuel cell device according to claim 14, further comprising:

an exhaust heat utilization unit configured to reutilize heat discharged from the fuel cell module and/or the external reformer.

17. The metal support-type fuel cell according to claim 1, wherein the flow direction of the reducing gas flowing through the reducing gas supply path and a flow direction of an oxidizing gas flowing through the oxidizing gas supply path are a longitudinal direction of the square shape.

* * * * *